(12) United States Patent
Moriuchi et al.

(10) Patent No.: US 9,709,674 B2
(45) Date of Patent: Jul. 18, 2017

(54) RADAR DEVICE AND SIGNAL PROCESSING METHOD

(71) Applicant: FUJITSU TEN LIMITED, Kobe-shi, Hyogo (JP)

(72) Inventors: Takumi Moriuchi, Kobe (JP); Yasuhiro Kurono, Kobe (JP); Hiroki Ishikawa, Kobe (JP)

(73) Assignee: FUJITSU TEN LIMITED, Hyogo (JP)

( * ) Notice: Subject to any disclaimer, the term of this patent is extended or adjusted under 35 U.S.C. 154(b) by 124 days.

(21) Appl. No.: 14/934,751

(22) Filed: Nov. 6, 2015

(65) Prior Publication Data

US 2016/0154103 A1 Jun. 2, 2016

(30) Foreign Application Priority Data

Nov. 28, 2014 (JP) ................................. 2014-241838

(51) Int. Cl.
| | | |
|---|---|---|
| *G01S 13/93* | (2006.01) | |
| *G01S 13/34* | (2006.01) | |
| *G01S 13/72* | (2006.01) | |
| *G01S 7/35* | (2006.01) | |

(52) U.S. Cl.
CPC .......... *G01S 13/931* (2013.01); *G01S 13/345* (2013.01); *G01S 13/726* (2013.01); *G01S 2007/356* (2013.01); *G01S 2013/9353* (2013.01)

(58) Field of Classification Search
CPC .... G01S 13/931; G01S 13/726; G01S 13/345; G01S 2007/356; G01S 2013/9353

USPC ........... 342/70–72, 107–109, 111, 192, 196; 340/435, 436, 903; 701/301
See application file for complete search history.

(56) References Cited

U.S. PATENT DOCUMENTS

| | | | |
|---|---|---|---|
| 2012/0293358 A1* | 11/2012 | Itoh ........................... | G01S 3/74 342/107 |
| 2013/0257642 A1* | 10/2013 | Kawabe ................ | G01S 13/931 342/70 |
| 2014/0184437 A1* | 7/2014 | Takabayashi ........... | G01S 13/66 342/107 |
| 2015/0097718 A1* | 4/2015 | Sato ........................ | G01S 13/34 342/147 |
| 2016/0084942 A1* | 3/2016 | Mizutani ............... | G01S 13/345 701/96 |
| 2016/0124076 A1* | 5/2016 | Nakatani ............... | G01S 7/4026 342/174 |

(Continued)

FOREIGN PATENT DOCUMENTS

| | | |
|---|---|---|
| JP | 2000-180540 A | 6/2000 |
| JP | 2003-149337 A | 5/2003 |

(Continued)

*Primary Examiner* — John B Sotomayor
(74) *Attorney, Agent, or Firm* — Oliff PLC

(57) ABSTRACT

A radar device generates pair data items by associating angle peaks of an up section and angle peaks of a down section. Thereafter, on the basis of a plurality of specific pair data items whose positions are close to each other in an angle direction and which are substantially the same in the position in a distance direction intersecting with the angle direction and are substantially the same in relative speed, the radar device derives one representative pair data item. The derivation of one representative pair data item is performed before continuity determination of a continuity determining unit at the same process timing is performed.

8 Claims, 22 Drawing Sheets

(56) References Cited

U.S. PATENT DOCUMENTS

2016/0131742 A1* 5/2016 Schoor ................ H01Q 1/3233
342/128

FOREIGN PATENT DOCUMENTS

| JP | 2003-255047 A | | 9/2003 | | |
|---|---|---|---|---|---|
| JP | 2012103118 A | * | 5/2012 | ........... | G01S 13/931 |

* cited by examiner

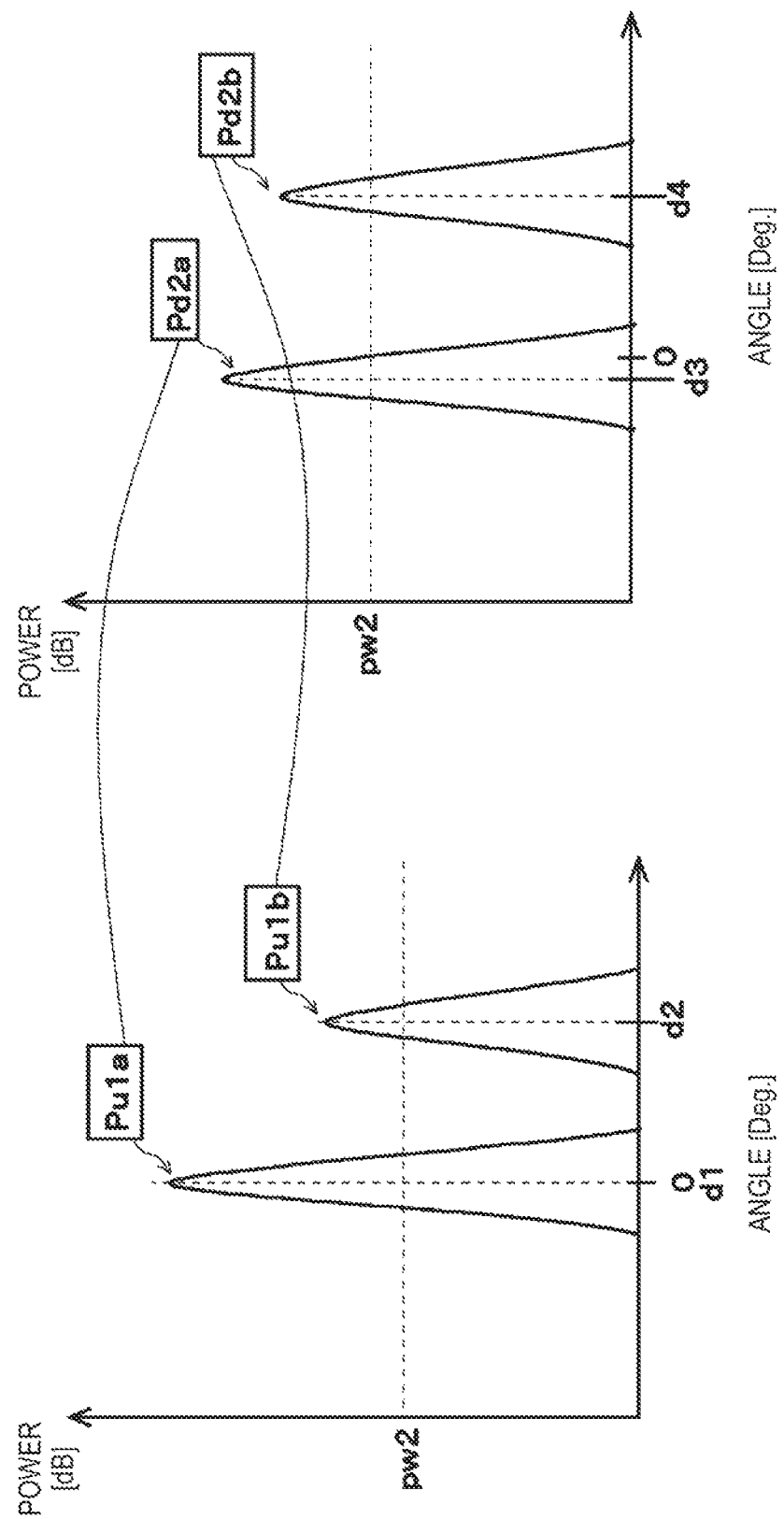

RADAR DEVICE AND SIGNAL PROCESSING METHOD

CROSS-REFERENCE TO RELATED APPLICATIONS

This application is based on and claims priority under 35 USC 119 from Japanese Patent Application No. 2014-241838 filed on Nov. 28, 2014, the entire content of which is incorporated herein by reference.

BACKGROUND

1. Technical Field

The present invention relates to a target deriving process.

2. Related Art

A radar device transmits transmission waves based on a transmission signal to the outside of a vehicle, and receives reflected waves from targets (for example, reflection points of preceding vehicles), and extracts frequency peaks. The frequency peaks are extracted from up sections in which the frequency of the transmission signal increases and down sections in which the frequency decreases, respectively.

The radar device calculates angle peaks which represent the angles of the targets with the frequency peaks of the individual sections, and associates the angle peaks of the individual sections with each other on the basis of a predetermined condition, thereby generating pair data items. The pair data items are data items including target information items of the targets. The target information items are information such as the longitudinal distances, transverse distances, and relative speeds of the targets as seen from the radar device. The longitudinal distances are the moving distances of the reflected waves from the positions of the targets to the radar device. The transverse distances are distances from the position of the radar device to the positions of the targets in the vehicle width direction of the vehicle.

On the basis of the target information items of the pair data items, the radar device determines whether pair data items generated at different process timings are pair data items of the same target. The different process timings are, for example, the timing of a previous target deriving process (hereinafter, referred to as the "previous process") and the timing of a current target deriving process (hereinafter, referred to as the "current process"). The previous process and the current process are temporarily consecutive processes. As described above, the radar device determines whether pair data items generated at the different process timings are pair data items of the same target, other words, the radar device determines whether a pair data item of the previous process and a pair data item of the current process are temporarily consecutive pair data items. Thereafter, the radar device outputs target information items of pair data items having continuity a predetermined number of times in a plurality of processes, to a vehicle control device. Also, as a reference material describing a technology related to the present invention, there is Patent Literature 1 (JP-A-2003-149337).

SUMMARY

However, sometimes, the radar device receives reflected waves from a plurality of reflection points of, for example, one preceding vehicle in one target deriving process (for example, the previous process). That is, sometimes, the radar device generates a plurality of pair data items belonging to one preceding vehicle in one target deriving process.

Even in the current process following the previous process in time without interruption, the radar device may generate a plurality of pair data items belonging to one preceding vehicle. In contrast with this, even in a case of generating a plurality of pair data items belonging to one preceding vehicle in the previous process, in the current process, the radar device may generate one pair data item belonging to one preceding vehicle. Due to some factors such as movements of preceding vehicles, the positional relations between the vehicle and the preceding vehicles varies between the timings of the individual processes. For this reason, with respect to one reflection point, the reflection angle and reflection level of a reflected wave may vary. As a result, the number of pair data items belonging to one target corresponding to one preceding vehicle in the previous process may be different from that in the current process.

As described above, in a case where there is a plurality of pair data items belonging to one target in each process, or in a case where the number of pair data items in the previous process is different from that in the current process, the radar device may perform an erroneous continuity determination. That is, in a continuity determining process, the radar device may erroneously determine that a pair data item of the previous process and a pair data item of the current process originally having no continuity are pair data items having continuity. For example, in a case of generating a pair data item corresponding to a reflection point positioned substantially at the center of the rear bumper of a preceding vehicle in the previous process and generating a pair data item corresponding to a reflection point positioned on the right side of the rear bumper of the corresponding vehicle, the radar device may determine that those pair data items have continuity. The position of the reflection point of the rear bumper is a position in the vehicle width direction. As a result, the radar device may be unable to derive accurate target information items, whereby the vehicle control device may be unable to perform appropriate control on the vehicle on the basis of target information items acquired from the radar device.

An illustrative aspect of the present invention is to derive accurate target information items even in a case where there is a plurality of pair data items belonging to one target in each of temporarily consecutive processes, or a case where the number of pair data items belonging to one target varies between temporarily consecutive processes.

[1] An aspect of the present invention provides a radar device including: a peak extracting unit that extracts frequency peaks representing the difference frequencies between a transmission signal whose frequency varies in a predetermined cycle and reception signals obtained by receiving reflected waves of a transmission wave based on the transmission signal from targets, in each section of an up section in which the frequency of the transmission signal increases and a down section in which the frequency of the transmission signal decreases; an angle calculating unit that calculates angle peaks representing angels of the targets relative to the frequency peaks; a pairing unit that generates pair data items by associating the angle peaks of the up section and the angle peaks of the down sections; a first representative deriving unit that derives one representative pair data item on the basis of a plurality of a specific pair data items whose positions in an angle direction are close to each other and which are substantially the same in the position in a distance direction intersecting with the angle direction and are substantially the same in relative speed;

and a continuity determining unit that determines whether one representative pair data item derived in a past process and one representative pair data item derived in a current process are data items belonging to the same target at different process timings, in which the first representative deriving unit derives one representative pair data item before continuity determination of the continuity determining unit at the same process timing is performed.

[2] The radar device according to [1], may have a configuration in which: in a case where there is not a plurality of specific pair data items in the past process, the first representative deriving unit stops representative pair data item derivation of the past process, and the continuity determining unit determines whether one pair data item generated in the past process and one representative pair data item derived in the current process are data items belonging to the same target at different process timings.

[3] The radar device according to [1] or [2], may have a configuration in which: in a case where there is not a plurality of specific pair data items in the current process, the first representative deriving unit stops representative pair data item derivation of the current process, and the continuity determining unit determines whether one representative pair data item derived in the past process and one pair data item generated in the current process are data items belonging to the same target at different process timings.

[4] The radar device according to any one of [1] to [3], may have a configuration in which: in a case where a vehicle equipped with the radar device runs a lane and there is a plurality of specific pair data items, if all of the plurality of specific pair data items exist in a range of the lane of the vehicle, the first representative deriving unit derives the representative pair data item.

[5] The radar device according to any one of [1] to [4], may further include: a second representative deriving unit that derives one representative past correspondence pair data item on the basis of a plurality of past correspondence pair data items which is included in past correspondence pair data items of the current process determined as having continuity and exists in a predetermined range in the distance direction, after the continuity determination is performed.

[6] The radar device according to [5], may further include: a history peak extracting unit that extracts history peaks belonging to an object to which the past correspondence pair data items belong, on the basis of a prediction value predicted from the past correspondence pair data items, in each section of the up section and the down section in the next process; and a history pairing unit that generates history pair data items by associating the history peaks of the up section and the history peaks of the down section, in which in a case where there is a plurality of specific pair data items and all of the pair data items are the history pair data items, the first representative deriving unit stops representative pair data item derivation.

[7] The radar device according to [5] or [6], may have a configuration in which: in a case where the plurality of specific pair data items is data items including two or more history pair data items and one new pair data item other than the history pair data items, the first representative deriving unit derives the representative pair data item on the basis of the new pair data item and a history pair data item whose position is the closest to the new pair data item in the angle direction.

[8] Another aspect of the present invention provides a signal processing method including: a step (a) of extracting frequency peaks representing the difference frequencies between a transmission signal whose frequency varies in a predetermined cycle and reception signals obtained by receiving reflected waves of a transmission wave based on the transmission signal from targets, in each section of an up section in which the frequency of the transmission signal increases and a down section in which the frequency of the transmission signal decreases; a step (b) of calculating angle peaks representing angels of the targets relative to the frequency peaks; a step (c) of generating pair data items by associating the angle peaks of the up section and the angle peaks of the down sections; a step (d) of deriving one representative pair data item on the basis of a plurality of a specific pair data items whose positions in an angle direction are close to each other and which are substantially the same in the position in a distance direction intersecting with the angle direction and are substantially the same in relative speed; and a step (e) of determining whether one representative pair data item derived in a past process and one representative pair data item derived in a current process are data items belonging to the same target at different process timings, in which the step (d) derives one representative pair data item before continuity determination of the continuity determining unit at the same process timing is performed.

According to [1] or [8], the radar device (the signal processing method) can surely determine a representative pair data item of a previous process and a representative pair data item of a current process corresponding to the same target, and can derive accurate target information items of targets.

According to [2], even in a case where the number of pair data items of a previous process is one and the number of pair data items of a current process is two or more, the radar device can derive accurate target information item of targets on the basis of the pair data item of the previous process and a representative pair data item of the current process.

According to [3], even in a case where the number of pair data items of a previous process is two or more, and the number of pair data items of the current process is one, the radar device can derive accurate target information items of targets on the basis of a representative pair data item of the previous process and the pair data item of the current process.

According to [4], the radar device can derive accurate target information items of targets existing in the range of the lane of the vehicle.

According to [5], in a case where there is a plurality of filter data items at different positions in the distance direction, the radar device can derive a plurality of filter data items belonging to one object, as one representative filter data item, and can derive accurate target information items of targets.

According to [6], the radar device can avoid derivation of one representative pair data item based on pair data items belonging to different objects, and can prevent derivation of incorrect target information items of targets.

According to [7], even in a case where there are two history pair data items, the radar device can surely select a history pair data item belonging to an object to which a new pair data item belongs, and can derive accurate target information items of targets.

BRIEF DESCRIPTION OF DRAWINGS

FIG. 11 is a view for explaining pairing of angle peaks of an up section and angle peaks of a down section.

DESCRIPTION OF EMBODIMENTS

Hereinafter, embodiments of the present invention will be described with reference to the accompanying drawings.

First Embodiment

1. Block Diagram of System

Figure 1:
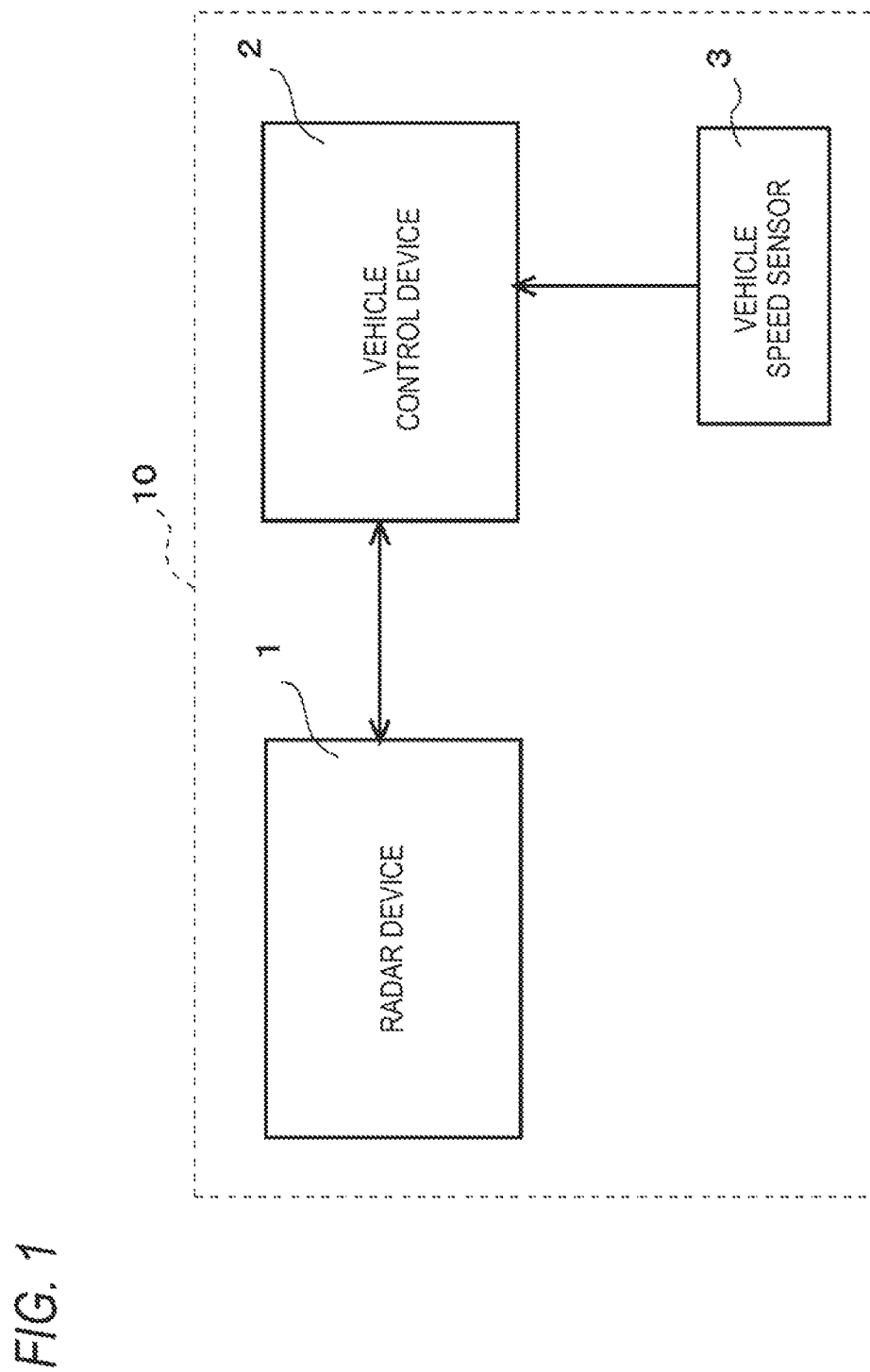
FIG. 1 is a view illustrating the configuration of a vehicle control system.

FIG. 1 is a view illustrating the configuration of a vehicle control system 10 according to a first embodiment. The vehicle control system 10 is installed in a vehicle such as a car. The vehicle moves in a running direction, that is, forward or backward. As shown in FIG. 1 the vehicle control system 10 mainly includes a radar device 1, a vehicle control device 2, and a vehicle speed sensor 3.

The radar device 1 of the present embodiment derives targets including moving targets and still targets existing around the vehicle by frequency-modulated continuous waves (FM-CWs). A moving target is a target moving at a certain speed and having a relative speed different from the speed of the vehicle. A moving target is, for example, a preceding vehicle which runs in the lane of the vehicle equipped with the radar device 1, in the same direction as that of the vehicle. Also, a still target is a target having a relative speed substantially equal to the speed of the vehicle. A still target is, for example, a guard rail provided at least one side of the left and right of the lane of the vehicle.

Also, the radar device 1 derives target information items. The target information items are information items such as the longitudinal distances, transverse distances, and relative speeds of targets. Each longitudinal distance (in meter) is a value representing the moving distance of a reflected wave from a target to a receiving antenna of the radar device 1. Each relative speed (in the unit of km/h) is a value representing the speed of a target relative to the vehicle. Each transverse distance (in meter) is a value representing a distance from the position of the radar device 1 to the position of a target in the left-right direction (vehicle width direction) of the vehicle. Each transverse distance is a distance which is derived on the basis of the angle of a target to be described below. The radar device 1 outputs the target information items to the vehicle control device 2.

The vehicle control device 2 is connected to components of the vehicle such as a brake and a throttle, and acquires the target information items output from the radar device 1, and controls behavior of the vehicle. Therefore, it can be said that the vehicle control device 2 is a data using device which uses the target information items. For example, the vehicle control device 2 uses the target information items acquired from the radar device 1 to keep a constant distance from a preceding vehicle while following the preceding vehicle. In this way, the vehicle control system 10 of the present embodiment acts as a preceding-vehicle following system.

Also, for example, the vehicle control device 2 uses the target information items acquired from the radar device 1 to decelerate the vehicle, thereby avoiding collision of the vehicle with roadblocks existing in the running direction of the vehicle, and protecting passengers of the vehicle. In this way, the vehicle control system 10 of the present embodiment acts as a collision avoiding system.

On the basis of the number of revolutions of the axle of the vehicle, the vehicle speed sensor 3 outputs a signal according to the speed of the vehicle to the vehicle control device 2. The vehicle control device 2 detects the current speed of the vehicle on the basis of the signal from the vehicle speed sensor 3.

2. Block Diagram of Radar Device

Figure 2:
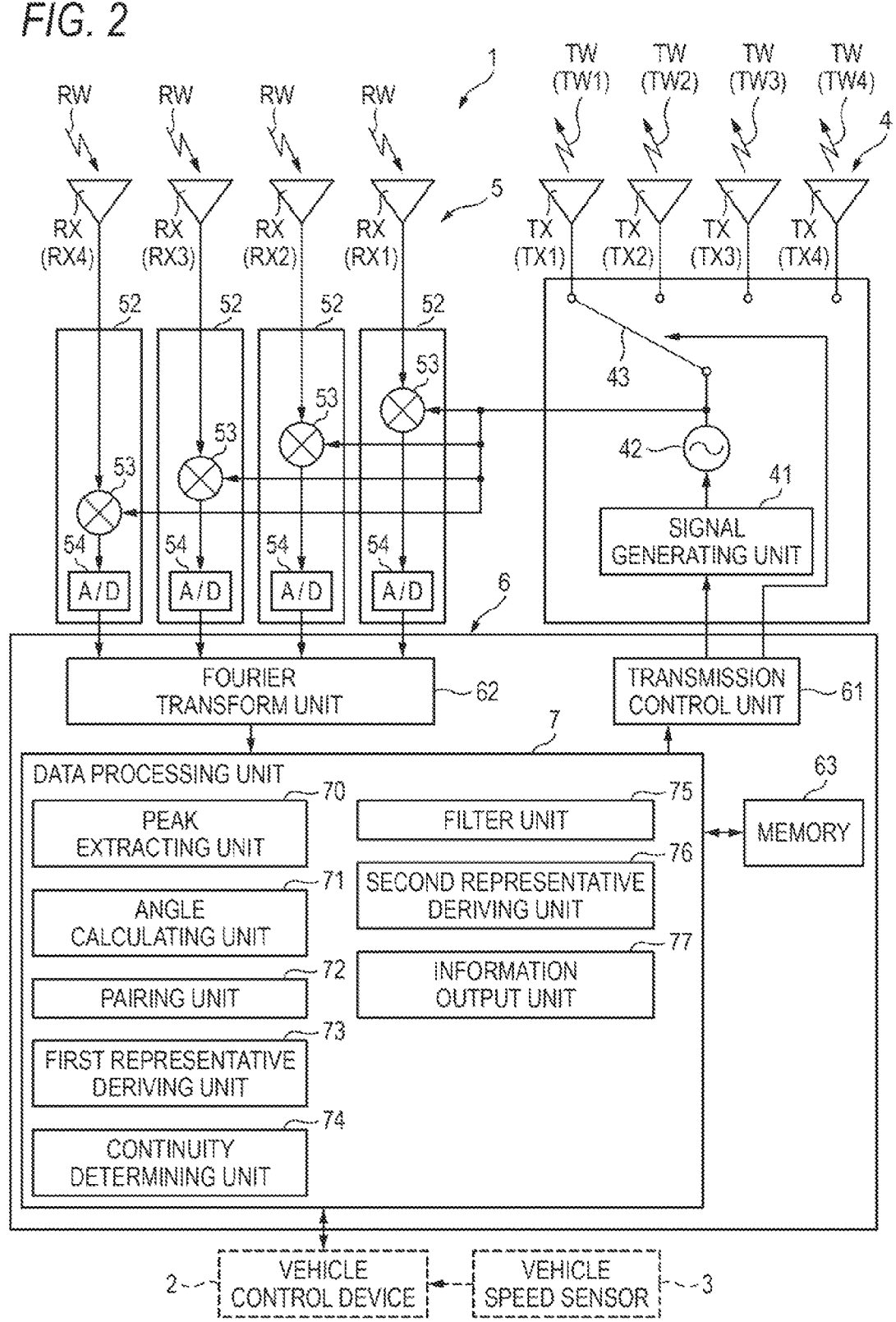
FIG. 2 is a view illustrating the configuration of a radar device of a first embodiment.

FIG. 2 is a view illustrating the configuration of the radar device 1 of the first embodiment. The radar device 1 is installed, for example, inside a front grille of the vehicle, and outputs transmission waves to the outside of the vehicle, thereby receiving reflected waves from targets. Also, the radar device 1 mainly includes a transmitting unit 4, a receiving unit 5, and a signal processing unit 6.

The transmitting unit 4 includes a signal generating unit 41, an oscillator 42, and a switch 43. The signal generating unit 41 generates a modulation signal whose voltage varies in a transmission wave form, and supplies the modulation signal to the oscillator 42. The oscillator 42 performs frequency modulation on a continuous-wave signal on the basis of the modulation signal generated by the signal generating unit 41, thereby generating a transmission signal whose frequency varies with time, and outputs the transmission signal to each transmitting antenna TX.

The switch 43 connects any one of transmitting antennae TX1 to TX4 to the oscillator 42. The switch 43 is switched at predetermined timings (for example, at intervals of 5 msec) by control of a transmission control unit 61 to be described below. As a result, the transmitting antennae TX for outputting the transmission waves are switched by the switch 43.

The transmitting antennae TX are antennae for outputting the transmission waves TW to the outside of the vehicle on the basis of the transmission signal. The transmission antennae TX are composed of four transmitting antennae TX1 to TX4. The transmitting antennae TX1 to TX4 output transmission waves TW1 to TW4, and are switched at a predetermined cycle by switching of the switch 43. Like this, the transmission waves TW are subsequently output from any one transmitting antenna of the four transmitting antennae by switching of the switch 43.

The four transmitting antennae TX output the transmission waves TW in different directions, respectively. For example, with respect to two axes of the vehicle equipped with the radar device 1, that is, the vehicle width direction (left-right direction) and height direction (vertical direction) of the vehicle, the transmitting antenna TX1 outputs the transmission wave TW1 obliquely toward the upper right side, and the transmitting antenna TX2 transmits the transmission wave TW2 obliquely toward the upper left side. Also, the transmitting antenna TX3 outputs the transmission wave TW3 obliquely toward the lower right side, and the transmitting antenna TX4 outputs the transmission wave TW4 obliquely toward the lower left side.

The receiving unit 5 includes four receiving antennas RX which form an array antenna, and four individual receiving units 52 connected to the four receiving antennae RX, respectively. Each receiving antenna RX receives reflected waves RW from targets, and each individual receiving unit 52 processes a reception signal acquired by a corresponding receiving antenna RX.

Each individual receiving unit 52 includes a mixer 53 and an A/D converter 54. A reception signal which is acquired from reflected waves RW received by each receiving antenna RX is amplified by a low-noise amplifier (not shown) and then is transmitted to a corresponding mixer 53. The corresponding mixer 53 mixes the reception signal and a transmission signal which is input from the oscillator 42 of the transmitting unit 4.

As a result, a beat signal having a beat frequency which is the difference frequency between the frequency of the transmission signal and the frequency of the reception signal is generated. The beat signal generated by the mixer 53 is converted into a digital signal by a corresponding A/D converter 54, and then is output to the signal processing unit 6.

The signal processing unit 6 includes a micro computer, which includes a CPU, a memory 63, and so on. The signal processing unit 6 stores a variety of data which are operands, target information items which a data processing unit 7 derives, and so on, in the memory 63 which is a storage unit. Examples of the memory 63 include an erasable programmable read only memory (EPROM) and a flash memory.

The signal processing unit 6 includes the transmission control unit 61, a Fourier transform unit 62, and the data processing unit 7, as functions which are implemented in a software wise by the micro computer. The transmission control unit 61 controls the signal generating unit 41 of the transmitting unit 4, and controls switching of the switch 43.

The Fourier transform unit 62 performs fast Fourier transform (FFT) on the beat signal output from each of the plurality of individual receiving units 52. in this way, the Fourier transform unit 62 converts the beat signal related to the reception signal of each of the plurality of receiving antennae RX, into a frequency spectrum which is a frequency-domain data item. Each frequency spectrum acquired by the Fourier transform unit 62 is output to the data processing unit 7.

The data processing unit 7 mainly includes a peak extracting unit 70, an angle calculating unit 71, a pairing unit 72, a first representative deriving unit 73, a continuity determining unit 74, a filter unit 75, a second representative deriving unit 76, and an information output unit 77.

If the Fourier transform unit 62 acquires frequency spectra having up sections in which the frequency of the transmission signal increases and down sections in which the frequency decreases, from each section, the peak extracting unit 70 extracts frequency peaks exceeding a predetermined signal level. Each frequency peak is a signal which mainly has a frequency and a signal level (frequency power) and exceeds predetermined frequency power.

The angle calculating unit 71 calculates angle peaks representing the angles of targets related to the frequency peaks, in each section of the up sections and the down sections, by a predetermined angle estimation method. Each angle peak is a signal which mainly has an angle and a signal level (angle power) as parameters and exceeds predetermined angle power. The predetermined angle estimation method is, for example, a method using ESPRIT (Estimation of Signal Parameters via Rotational Invariance Techniques).

In case of using an ESPRIT method, the angle calculating unit 71 calculates, at most, three angle peaks with respect to one frequency peak. That is, at a frequency representing the frequency peak of one section (for example, an up section), the angle calculating unit 71 can calculate, at most, three angle peaks having the same frequency and different angles. Also, each frequency can be expressed in unit of BIN, 1 BIN corresponds to about 468 Hz.

The pairing unit 72 associates the angle peaks of the up sections with the angle peaks of the down sections, thereby generating pair data items. For example, using Mahalanobis distances, the angle peaks of the up sections and the angle peaks of the down sections are associated with each other.

The pairing unit 72 calculates Mahalanobis distances MD by Expression 1 using an angle difference θd, a signal level difference θp, and coefficients "a" and "b". Each angle difference θd is the angle difference between an angle peak of an up section and an angle peak of a down section. Each signal level difference θp is the signal level difference between an angle peak of an up section and an angle peak of a down section.

$$MD = a(\theta d)^2 + b(\theta p)^2 \qquad \text{[Expression 1]}$$

The pairing unit 72 associates the angle peaks of the up sections and the angle peaks of the down sections with each other such that Mahalanobis distances become minimum values, thereby generating the pair data items. Thereafter, the pairing unit 72 derives target information items from the pair data items.

Figure 3:
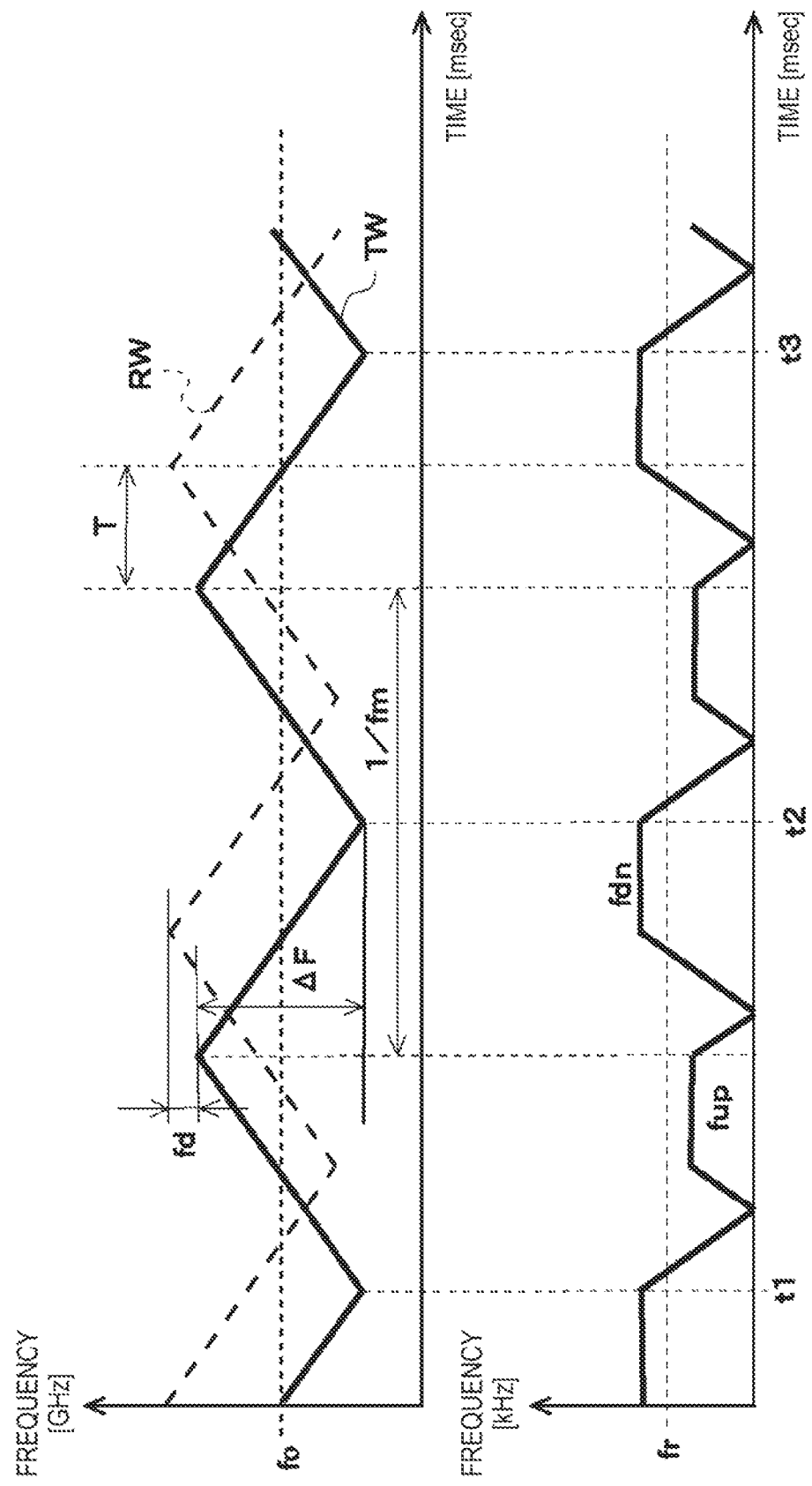
FIG. 3 is a view illustrating the relation between a transmission wave and a reflected wave.

Now, the target information deriving process which the pairing unit 72 performs will be described in detail with reference to FIG. 3. FIG. 3 is a view illustrating the relation between a transmission wave TW and a reflected wave RW. In order to simplify the explanation, the reflected wave RW shown in FIG. 3 is considered as an ideal reflected wave from one target. The transmission wave TW is shown by a solid line, and the reflected wave RW is shown by a broken line.

In the upper portion of FIG. 3, the vertical axis represents frequency in GHz, and the horizontal axis represents time in microseconds. Also, with reference to FIG. 3, two transmission waves, that is, the transmission wave TW1 which is output toward the upper right side and the transmission wave TW3 which is output toward the lower right side will be described as examples. On the assumption that the transmission wave TW1 is output in a section from a time t1 to a time t2, and the transmission wave TW3 is output in a section from the time t2 to a time t3, the following description will be made.

As shown in FIG. 3, the transmission wave TW is a continuous wave whose frequency increases and decreases in a predetermined cycle with a predetermined frequency as the center. The frequency of the transmission wave TW changes linearly with time. The center frequency of the transmission wave TW is represented by f0, and the change width of the frequency of the transmission wave TW is represented by ΔF, and the reciprocal of one cycle in which the frequency of the transmission wave TW increases and decreases is represented by fm.

The reflected wave RW is a reflected wave of the transmission wave TW from a target, and thus is a continuous wave whose frequency increases and decreases in a predetermined cycle with a predetermined frequency as the center. However, in the reflected wave RW, a time delay relative to the transmission wave TW occurs. This delay time T depends on the longitudinal distance R of the target from the vehicle.

Also, in the reflected wave RW, a frequency shift of a frequency fd relative to the transmission wave TW occurs due to the Doppler effect according to the relative speed V of the target to the vehicle.

As described above, with respect to the transmission wave TW, in the reflected wave RW, the time delay according to the longitudinal distance and the frequency shift according to the relative speed occur. As a result, as shown in the lower portion of FIG. 3, the beat frequency of a beat signal which is generated by a mixer 53 differs between up sections and down sections. The beat frequency is the difference frequency between the frequency of the transmission wave TW and the frequency of the reflected wave RW. Hereinafter, the beat frequency of the up sections is represented by fup, and the beat frequency of the down sections is represented by fdn. Also, in the lower portion of FIG. 3, the vertical axis represents frequency in kHz, and the horizontal axis represents time in microseconds.

Here, if the beat frequency in a case where the relative speed of the target is 0 (zero) km/h (a case where there is no frequency shift attributable to the Doppler effect) is represented by fr, the beat frequency fr can be expressed by the following Expression 2.

$$fr = \frac{fup + fdn}{2} \quad \text{[Expression 2]}$$

This frequency fr is a value according to the above described delay time T. Therefore, the pairing unit 72 obtains the longitudinal distance R of the target by the following Expression 3 using the frequency fr.

$$R = \frac{c}{4 \cdot \Delta F \cdot fm} fr \quad \text{[Expression 3]}$$

Also, the frequency fd by which the frequency shift occurs due to the Doppler effect can be expressed by the following Expression 4.

$$fd = \frac{fup - fdn}{2} \quad \text{[Expression 4]}$$

Therefore, the pairing unit 72 obtains the relative speed V of the target by the following Expression 5 using the frequency fd.

$$V = \frac{c}{2 \cdot fo} fd \quad \text{[Expression 5]}$$

Also, the pairing unit 72 obtains the angle θ of a pair data item by the following Expression 6 using the angle θup of the angle peak of the up sections and the angle θdn of the angle peak of the down sections. Also, those angle peaks are angle peaks which are associated with each other in case of generating the pair data item.

$$\theta = \frac{\theta_{up} + \theta_{dn}}{2} \quad \text{[Expression 6]}$$

Thereafter, on the basis of the angle θ of the pair data item and the longitudinal distance R, the pairing unit 72 calculates the transverse distance of the pair data item by an operation using the trigonometric functions.

In the above description, the longitudinal distance, relative speed, and angle (transverse distance) of one target have been obtained. However, in reality, the radar device 1 simultaneously receives reflected waves RW from a plurality of targets. Therefore, the frequency spectra which the Fourier transform unit 62 obtains by performing FFT on the beat signals acquired from the reception signals include information on the plurality of targets.

Figure 4A:
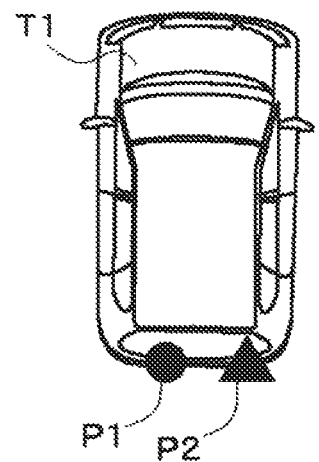
FIGS. 4A and 4B are views illustrating examples of pair data items.
Figure 4B:
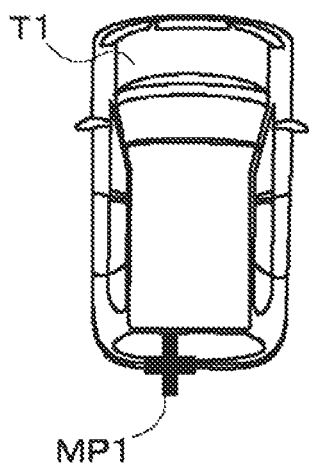

Returning to FIG. 2, before the continuity determining unit 74 (to be described below) performs continuity determination, the first representative deriving unit 73 derives one representative pair data item on the basis of two pair data items satisfying predetermined conditions. An example of derivation of a representative pair data item will be described with reference to FIGS. 4A and 4B. FIG. 4A is a view illustrating examples of two pair data items satisfying the predetermined conditions. FIG. 4B is a view illustrating an example of one representative pair data item.

The pairing unit 72 associates the pair data items of the up sections with the pair data items of the down sections. In this way, the pairing unit 72 individually generates a pair data item P1 and a pair data item P2 corresponding to different reflection points of a preceding vehicle T1 as shown in FIG. 4A. The pair data item P1 is, for example, a pair data item corresponding to a reflection point positioned substantially at the center of the rear bumper of the preceding vehicle T1 in the vehicle width direction. The pair data item P2 is, for example, a pair data item corresponding to a reflection point positioned on the right side of the rear bumper of the preceding vehicle T1 in the vehicle width direction.

In a case where the pair data item P1 and the pair data item P2 satisfy the predetermined conditions, the first representative deriving unit 73 derives one representative pair data item MP1 on the basis of those pair data items as shown in FIG. 4B.

Here, the predetermined conditions are, for example, the following conditions (a1)) to (a5). The first representative deriving unit 73 determines whether two pair data items satisfy the following conditions (a1) to (a5). For example, the first representative deriving unit 73 determines whether the pair data item P1 and the pair data item P2 satisfy the following conditions.

[FREQUENCY OF UP SECTION OF $P1$]≈[FREQUENCY OF UP SECTION OF $P2$]     (a1)

[FREQUENCY OF DOWN SECTION OF $P1$]≈[FREQUENCY OF DOWN SECTION OF $P2$]     (a2)

|TRANSVERSE DISTANCE OF $P1$|≤1.8 m     (a3)

|TRANSVERSE DISTANCE OF $P2$|≤1.8 m     (a4)

|(TRANSVERSE DISTANCE OF $P1$)−(TRANSVERSE DISTANCE OF $P2$)|≤0.5 m     (a5)

According to the conditions (a1)) and (a2), it is determined that the pair data item P1 and the pair data item P2 are almost the same in longitudinal distance and relative speed. That is, it is determined that the two pair data items are almost the same in, the position in the distance direction intersecting with the angle direction and are almost the same in relative speed.

The angle peak constituting the pair data item P1 and the angle peak constituting the pair data item P2 are angle peaks derived from the frequency peaks. Therefore, the pair data items P1 and P2 are frequency information items related to the frequency peaks.

According to the conditions (a3) and (a4), it is determined that the pair data item P1 and the pair data item P2 are pair data items existing in the range of the lane of the vehicle. The lane of the vehicle is a lane where the vehicle equipped with the radar device 1 runs.

According to the condition (a5), it is determined that the pair data item P1 and the pair data item P2 are pair data items existing at positions relatively close in the vehicle width direction. That is, according to the condition (a5), it is determined that the positions of the two pair data items in the angle direction are relatively close to each other.

In a case where the pair data item P1 and the pair data item P2 satisfy all of the conditions (a1) to (a5), the first representative deriving unit 73 derives the representative pair data item MP1. Here, the first representative deriving unit 73 sets each parameter of the representative pair data item MP1 on the basis of parameters included in the pair data item P1 and the pair data item P2.

The first representative deriving unit 73 sets the longitudinal distance and relative speed of the representative pair data item MP1 to the same values as the longitudinal distance and relative speed of any one (for example, the pair data item P1) of the two pair data items. Also, the first representative deriving unit 73 sets the angle or transverse distance of the representative pair data item MP1 to the same value as the average of the angles or transverse distances of the two pair data items. Further, the first representative deriving unit 73 sets the angle power of the representative pair data item MP1 to the same value as a larger one of the angle powers of the two pair data items.

As described above, the first representative deriving unit 73 derives one representative pair data item on the basis of two pair data items which are almost the same in longitudinal distance and relative speed. As a result, the radar device 1 can derive accurate target information items of targets belonging to each object existing in the range of the lane of the vehicle. Further, the vehicle control device 2 can perform appropriate control on the vehicle on the basis of the target information items acquired from the radar device 1.

Figure 5A:
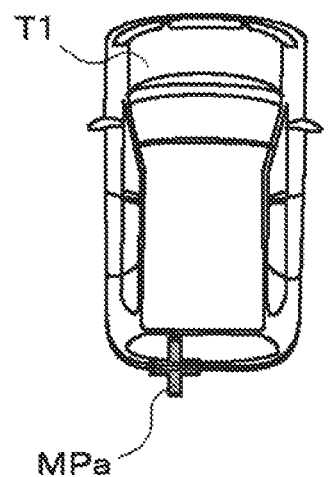
FIGS. 5A and 5B are views for explaining continuity determination.
Figure 5B:
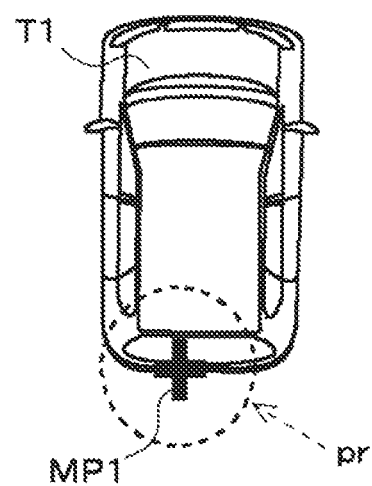

Subsequently, the continuity determining unit 74 determines existence or non-existence of temporal continuity between pair data items of the previous process and pair data items of the current process. That is, the continuity determining unit 74 determines whether any pair data item having temporal continuity with each pair data item generated in the previous target deriving process exists in the pair data items generated in the current target deriving process. FIGS. 5A and 5B are views for explaining continuity determination. As shown in FIG. 5A, the first representative deriving unit 73 derives a representative pair data item MPa in the previous process. On the basis of the target information item, such as the longitudinal distance, the transverse distance, and the relative speed, of the representative pair data item MPa of the previous process, the continuity determining unit 74 generates a prediction pair data item. The prediction pair data item is a prediction data item of a pair data item of the current process to have temporal continuity with the representative pair data item MPa of the previous process.

On the basis of the prediction pair data item, the continuity determining unit 74 sets a prediction range pr as shown in FIG. 5B. In the prediction range pr, the representative pair data item MP1 derived in the current process exists. Therefore, the continuity determining unit 74 determines that the representative pair data item MPa of the previous process and the representative pair data item MP1 of the current process are representative pair data items having temporal continuity. That is, the continuity determining unit 74 determines that the representative pair data item MPa and the representative pair data item MP1 are data items corresponding to the same target (the same reflection point of the preceding vehicle T1) at different process timings. As a result, the radar device 1 can surely determine a representative pair data item of the previous process and a representative pair data item of the current process corresponding to the same target, and can derive target information items of targets.

Meanwhile, in a case where the representative pair data item derived in the current process does not exist in the prediction range pr, the continuity determining unit 74 performs extrapolation. Extrapolation is a process of assuming that the prediction pair data item is a data item having continuity with the representative pair data item MPa of the previous process, if there is no representative pair data item in the prediction range pr. In a case where extrapolation is performed a predetermined number of times or more during a plurality of target deriving processes, the data processing unit 7 determines that a target which is an object of the extrapolation does not exist in the transmission range of the transmission waves TW, and deletes the target information item of a corresponding representative pair data item from the memory 63.

In a case of performing continuity determination in a plurality of processes and determining that representative pair data items have continuity, a predetermined number of times (for example, three times) or more, the filter unit 75 performs filtering on the representative pair data item. The filtering is a process of smoothing the target information items of two representative pair data items, that is, the representative pair data item derived in the previous process and the representative pair data item derived in the current process, in a time axis direction.

A data item obtained by the filtering will be referred to as the "filter data item" relative to the representative pair data items representing instantaneous values. One representative pair data item is a data item derived in one target deriving process (for example, the current process). In contrast with this, the filter data item is a data item obtained by adding the target information item of one representative pair data item derived in the previous process and the target information item of one representative pair data item derived in the current process at a predetermined ratio.

Figure 6A:
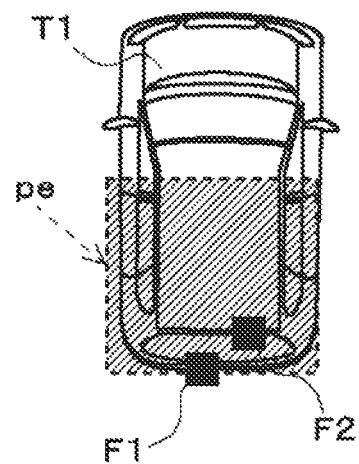
FIGS. 6A and 6B are views for explaining representative filter data item derivation of a second representative deriving unit.
Figure 6B:
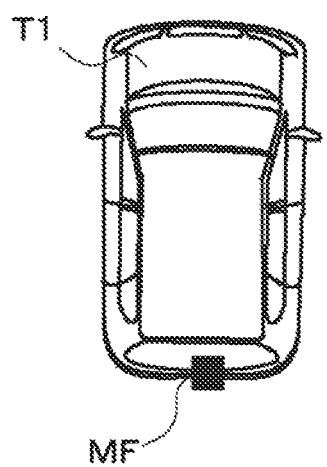

After the continuity determining unit 74 performs continuity determination, the second representative deriving unit 76 derives a representative pair data item on the basis of a plurality of filter data items belonging to one object (for example, the preceding vehicle T1) and derived in the current process. FIGS. 6A and 6B are views for explaining representative pair data item derivation of the second representative deriving unit 76. The second representative deriving unit 76 uses a filter data item F1 having the minimum transverse distance, as a reference data item. The filter data item F1 is a data item which the filter unit 75 has generated by smoothing the target information item of the representative pair data item MPa of the previous process and the target information item of the representative paired data item MP1 of the current process in the time direction.

As shown in FIG. 6A, the second representative deriving unit 76 sets a combination range pe on the basis of the position of the filter data item F1. The combination range pe is a range for deriving a representative pair data item on the basis of filter data items existing in the corresponding range. For example, in a case where the position of the filter data item F1 is defined by a longitudinal distance of ±0 m and a transverse distance of ±0 m, the combination range pe is a range whose longitudinal distance is +3 m and whose transverse distance is between +1.0 m and −1.0 m.

As shown in FIG. 6B, on the basis of the filter data item F1 and a filter data item F2 exiting in the combination range pe, the second representative deriving unit 76 derives a representative filter data item MF. The filter data item F2 is a data item generated on the basis of a representative pair data item of the previous process other than the representative pair data item MPa and a representative pair data item of the current process other than the representative pair data item MP1. The target information item of the representative filter data item MF has the same longitudinal distance as that of the filter data item F1, and has a transverse distance and a relative speed each of which is the average of those of the filter data item F1 and the filter data item F2. Also, the angle power of the representative filter data item MF is the same as a larger one of the angle powers of the filter data item F1 and the filter data item F2.

As a result, the radar device 1 can derive a plurality of filter data items belonging to one object, as one representative filter data item, in a case where there is a plurality of filter data items at different positions in the distance (longitudinal distance) direction, and can derive accurate target information items of targets.

The information output unit 77 outputs the target information item of the representative filter data item MF to the vehicle control device 2. In this way, the radar device 1 can derive accurate target information items of targets. The vehicle control device 2 performs appropriate control on the vehicle on the basis of the target information items acquired from the radar device 1.

3. Flow Chart of Process

Figure 7:
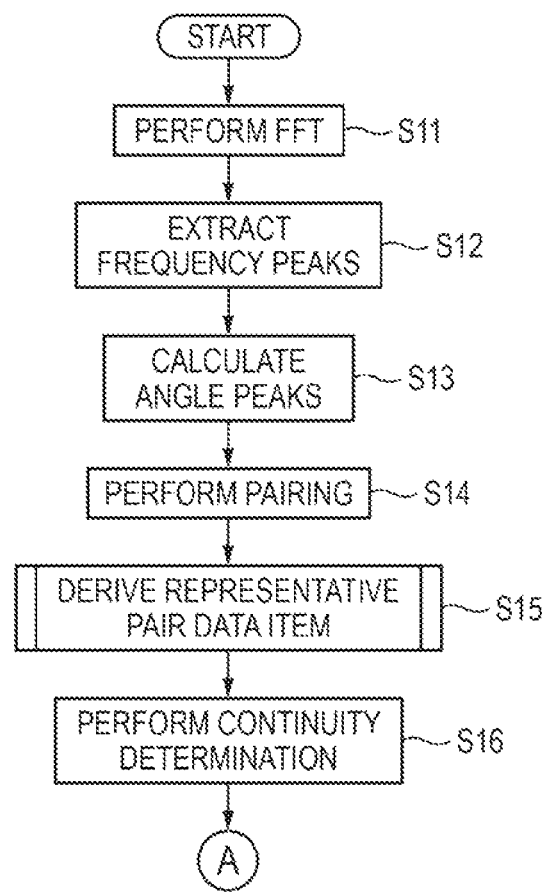
FIG. 7 is a flow chart of a target deriving process according to the first embodiment.
Figure 8:
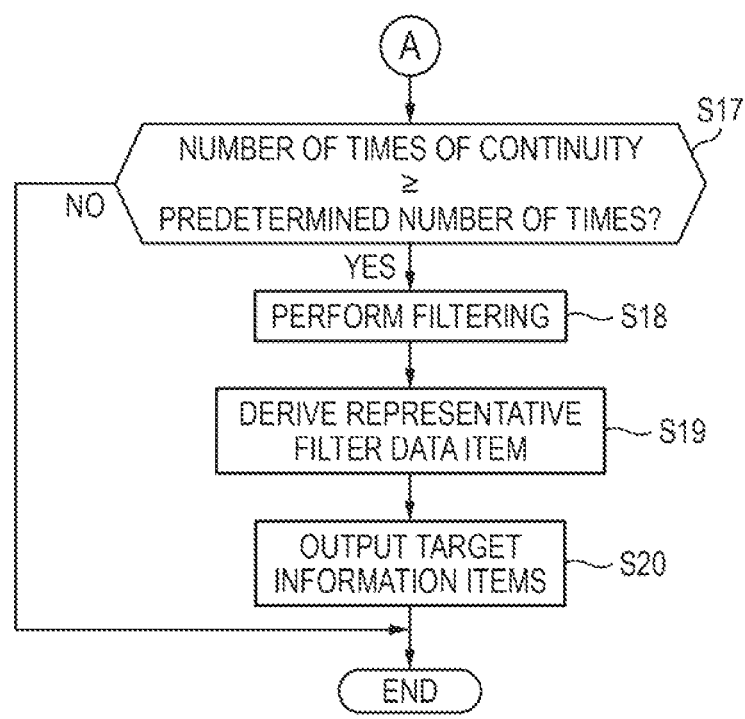
FIG. 8 is another flow chart of the target deriving process according to the first embodiment.

Subsequently, the overall flow of the target deriving process of the signal processing unit 6 will be described. FIGS. 7 and 8 are flow charts of the target deriving process according to the first embodiment. The signal processing unit 6 regularly repeats the target deriving process at intervals of a predetermined time (for example, 1/20 sec). At the start time of the target deriving process, the Fourier transform unit 62 outputs the frequency spectra of both of an up section and a down section of each of the four receiving antennae RX to the data processing unit 7.

In STEP S11, the Fourier transform unit 62 performs fast Fourier transform (FFT) on beat signals output from the plurality of individual receiving units 52, respectively. By performing FFT, the Fourier transform unit 62 converts the beat signals relative to reception signals of the plurality of receiving antennae RX, into frequency spectra which are frequency-domain data items. The frequency spectra acquired by the Fourier transform unit 62 are output to the data processing unit 7.

In STEP S12, the peak extracting unit 70 extracts frequency peaks exceeding the predetermined signal level from the up sections and the down sections of the frequency spectra obtained by the Fourier transform unit 62, respectively.

In STEP S13, the angle calculating unit 71 calculates angle peaks representing the angles of targets relative to the frequency peaks, in each section of the up sections and the down sections, by the predetermined angle estimation method.

In STEP S14, the pairing unit 72 associates the angle peaks of the up sections with the angle peaks of the down sections, thereby generating pair data items.

4. Specific Examples of Peak Extraction, Angle Peak Derivation, and Pairing

Now, specific examples of peak extraction, angle peak derivation, and pairing will be subsequently described with reference to FIGS. 9A to 11.

Figure 9A:
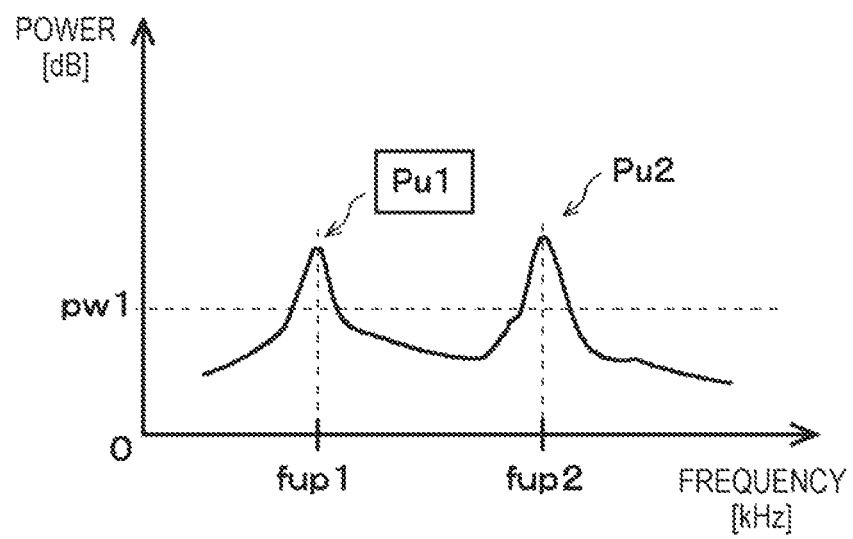
FIGS. 9A and 9B are views for explaining peak extraction.
Figure 9B:
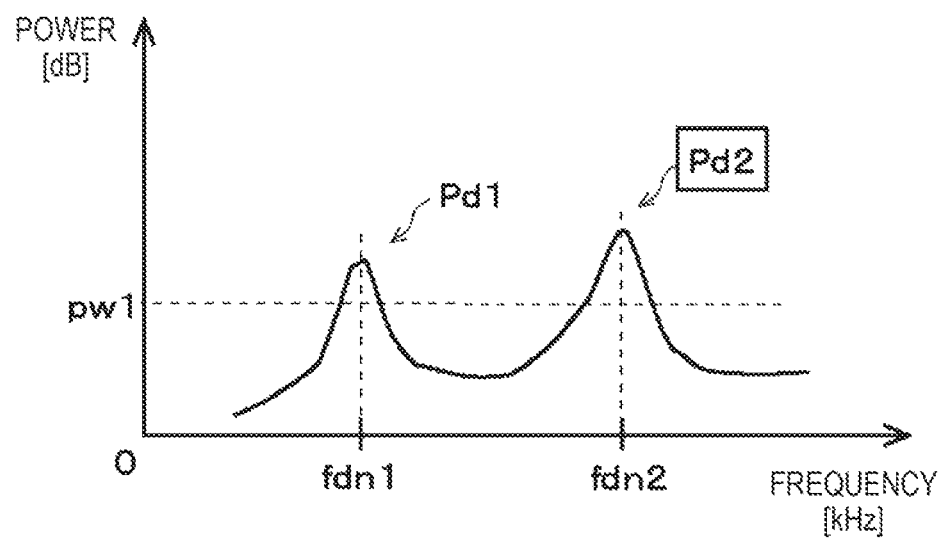

FIG. 9A is a view for explaining peak extraction of an up section. FIG. 9B is a view for explaining peak extraction of a down section. In FIG. 9A or 9B, the vertical axis represents signal power in dB. The horizontal axis represents frequency in kHz. The peak extracting unit 70 extracts a frequency peak Pu1 and a frequency peak Pu2 exceeding predetermined signal power pw1 from the up section. The frequency of the frequency peak Pu1 is fup1, and the frequency of the frequency peak Pu2 is fup2.

Also, the peak extracting unit 70 extracts a frequency peak Pd1 and a frequency peak Pd2 exceeding the predetermined signal power pw1 from the down section. The frequency of the frequency peak Pd1 is fdn1, and the frequency of the frequency peak Pd2 is fdn2.

Figure 10A:
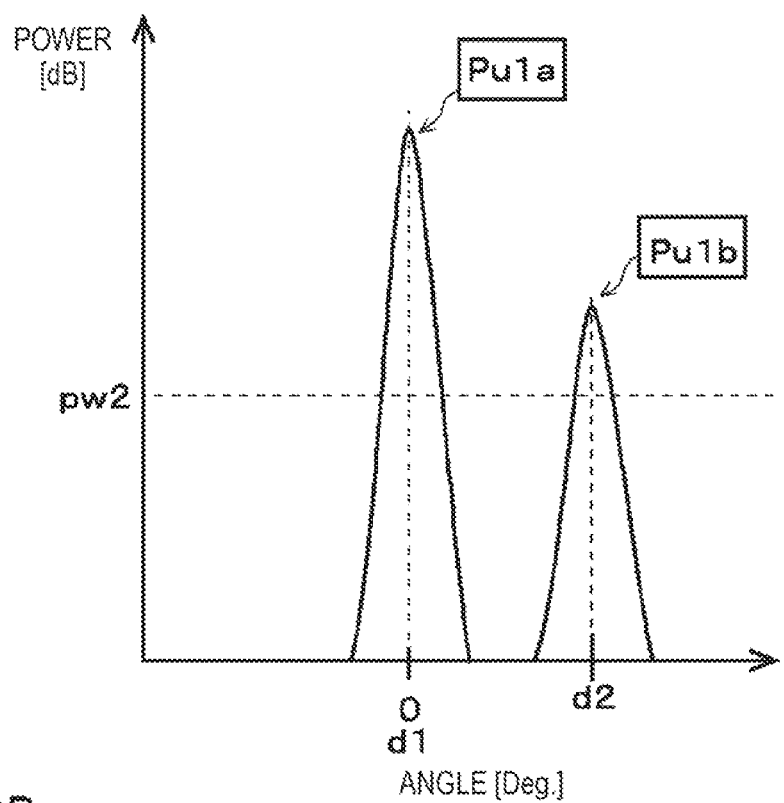
FIGS. 10A and 10B are views for explaining angle peak derivation.
Figure 10B:
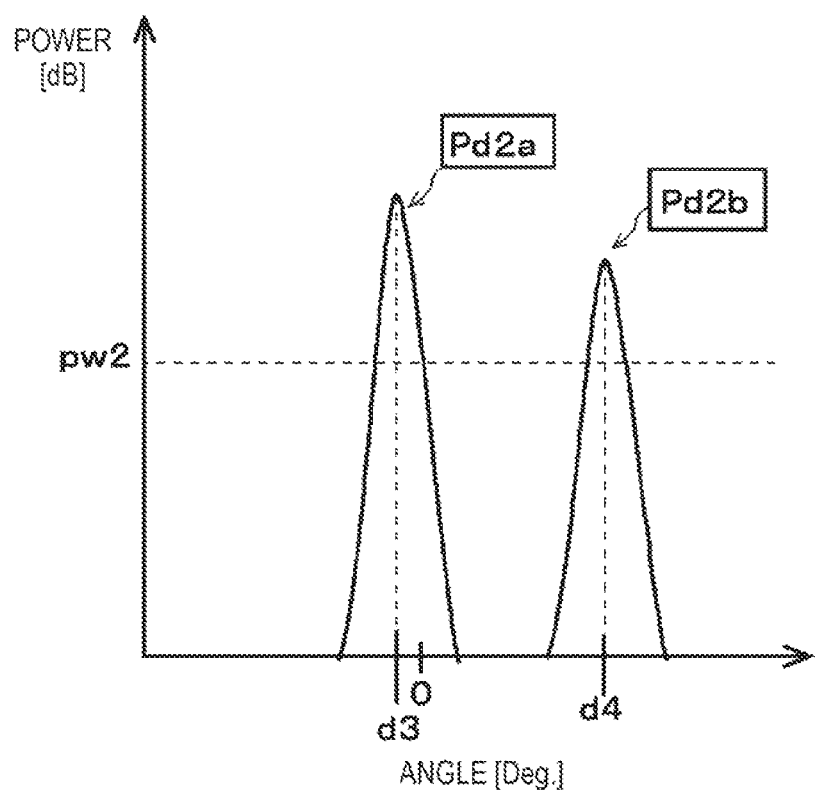

FIG. 10A is a view for explaining angle peak derivation of an up section. FIG. 10B is a view for explaining angle peak derivation of a down section. In FIG. 10A or 10B, the vertical axis represents signal power in dB. The horizontal axis represents angle in degree. The angle calculating unit 71 calculates an angle peak Pu1$a$ and an angle peak Pu1$b$ exceeding predetermined signal power pw2 from the up section by ESPRIT. These angle peaks are, for example, peaks representing the angles of two targets relative to the frequency peak Pu1, respectively. That is, the angle peak Pu1a and the angle peak Pu1b are angle peaks corresponding to the same frequency peak Pu1. The angle of the angle peak Pu1a is an angle d1 (±0°). The angle of angle peak Pu1b is an angle d2 which is on the positive side from ±0°.

Also, the angle calculating unit 71 calculates an angle peak Pd2a and an angle peak Pd2b exceeding the predetermined signal power pw2 from the down section by ESPRIT. These angle peaks are, for example, peaks representing the angles of two targets relative to the frequency peak Pd2, respectively. That is, the angle peak Pd2a and the angle peak Pd2b are angle peaks corresponding to the same frequency peak Pd2. The angle of the angle peak Pd2a is an angle d3 which is on the negative side from ±0°. The angle of the angle peak Pd2b is an angle d4 which is on the positive side from ±0°.

FIG. 11 is a view for explaining pairing of the angle peaks of the up section and the angle peaks of the down section. For example, the pairing unit 72 pairs the angle peak Pu1a with the angle peak Pd2a such that the Mahalanobis distance becomes a minimum value. That is, the pairing unit 72 associates the angle peak Pu1a with the angle peak Pd2a, thereby generating the pair data item P1 described with reference to FIG. 4A.

Also, for example, the pairing unit 72 pairs the angle peak Pu1b with the angle peak Pd2b such that the Mahalanobis distance becomes a minimum value. That is, the pairing unit 72 associates the angle peak Pu1b with the angle peak Pd2b, thereby the pair data item P2 described with reference to FIG. 4A.

Returning to FIG. 7, after pairing, in STEP S15, the first representative deriving unit 73 derives a representative pair data item on the basis of the two pair data items, before a continuity determining process of a series of target deriving processes is performed. That is, the first representative deriving unit 73 derives a representative pair data item on the basis of the two pair data items before a continuity determining process of the same target deriving process is performed.

5. Representative Pair Data Deriving Process

Figure 12:
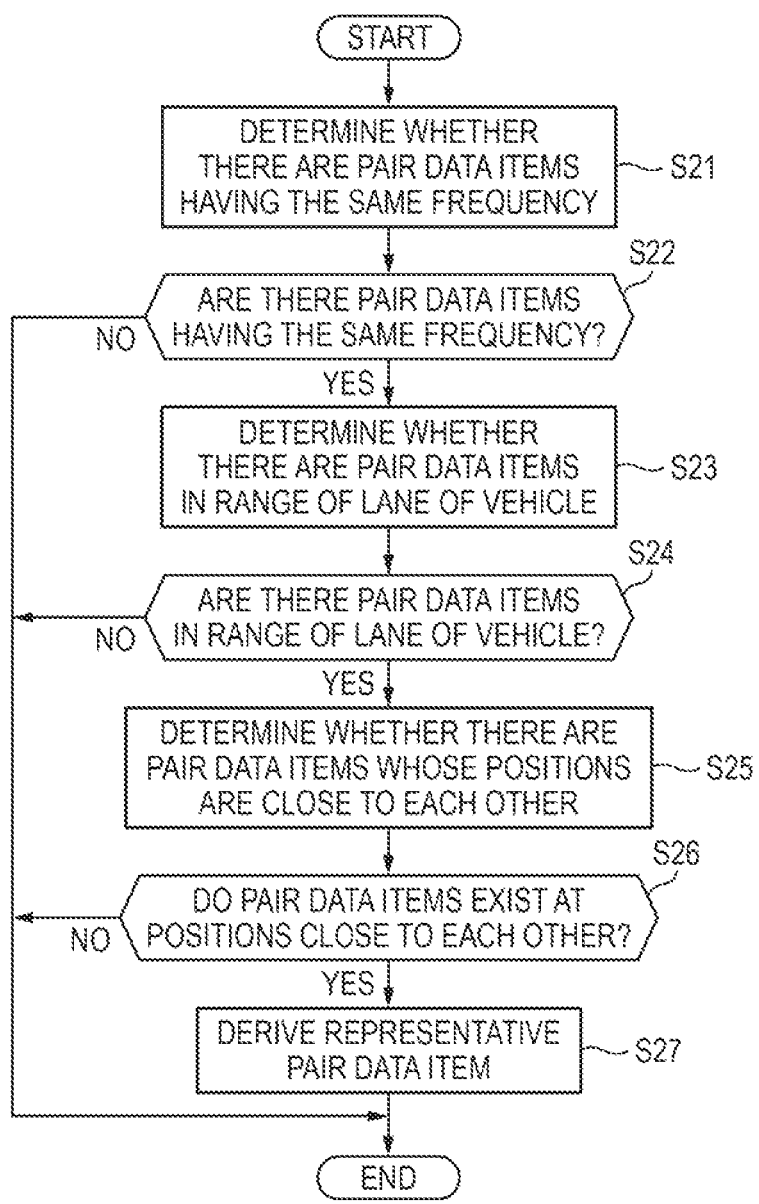
FIG. 12 is a flow chart of a representative pair data deriving process according to the first embodiment.

Hereinafter, the representative pair data deriving process will be described. FIG. 12 is a flow chart of the representative pair data deriving process according to the first embodiment. In STEP S21, the first representative deriving unit 73 determines whether there are two pair data items having the same frequency. That is, on the basis of the conditions (a1)) and (a2), the first representative deriving unit 73 determines whether the frequencies of the frequency peaks of the up sections of two pair data items are substantially the same as each other, and determines whether the frequencies of the frequency peaks of the down sections of two pair data items are substantially the same as each other.

For example, the frequency peaks of the up sections of the pair data item P1 and the pair data item P2 are the frequency peak Pu1 (the frequency fup1). Therefore, the frequencies of the frequency peaks of the up sections of both pair data items are the same. Also, the frequency peaks of the down sections of the pair data item P1 and the pair data item P2 are the frequency peak Pd2 (the frequency fdn2). Therefore, the frequencies of the frequency peaks of the down sections of both pair data items are the same. As a result, the pair data item P1 and the pair data item P2 satisfy the conditions (a1) and (a2) ("Yes" in STEP S22). Therefore, the first representative deriving unit 73 performs the next process.

Meanwhile, in a case where the two pair data items do not satisfy at least one of the conditions (a1)) and (a2) ("No" in STEP S22), the first representative deriving unit 73 finishes the process.

Subsequently, in STEP S23, the first representative deriving unit 73 determines whether the two pair data items exist in the range of the lane of the vehicle. That is, on the basis of the conditions (a3) and (a4), the first representative deriving unit 73 determines whether the two pair data items satisfying the conditions (a1) and (a2) exist in the range of the lane of the vehicle.

For example, in a case where the transverse distances of the pair data item P1 and the pair data item P2 are between +1.8 m and −1.8 m, the pair data item P1 and the pair data item P2 satisfy the conditions (a3) and (a4) ("Yes" in STEP S24). Therefore, the first representative deriving unit 73 performs the next process. Meanwhile, in a case where the two pair data items do not satisfy at least one of the conditions (a3) and (a4) ("No" in STEP S24), the first representative deriving unit 73 finishes the process.

Subsequently, in STEP S25, the first representative deriving unit 73 determines whether the positions of the two pair data items in the angle direction are close to each other. That is, on the basis of the condition (a5), the first representative deriving unit 73 determines whether the two pair data items satisfying the conditions (a3) and (a4) exist at positions close to each other in the angle direction.

For example, in a case where the interval between the position of the pair data item P1 and the position of the pair data item P2 in the vehicle width direction is between +1.5 m and −1.5 m, the first representative deriving unit 73 determines that the pair data item P1 and the pair data item P2 satisfy the condition (a5) ("Yes" in STEP S26), and derives the representative pair data item MP1 on the basis of the pair data item P1 and the pair data item P2 in STEP S27.

The first representative deriving unit 73 sets each parameter of the representative pair data item MP1 on the basis of the parameters of the pair data item P1 and the pair data item P2.

Meanwhile, in a case where the two pair data items do not satisfy the condition (a5) ("No" in STEP S26), the first representative deriving unit 73 finishes the process. In this way, the radar device 1 can derive accurate target information items of targets existing in the range of the lane of the vehicle. Further, the vehicle control device 2 can perform appropriate control on the vehicle on the basis of the target information items acquired from the radar device 1.

Returning to FIG. 7, in STEP S16, the continuity determining unit 74 determines whether there is temporal continuity between the representative pair data item derived in the previous process and the representative pair data item derived in the current process.

In a case where the number of times that it was determined during a plurality of target deriving processes that there was continuity between representative pair data items is equal to or greater than a predetermined number of times (for example, three times) ("Yes" in STEP S17 shown in FIG. 8), the filter unit 75 performs smoothing (filtering) on the representative pair data item derived the previous process and the representative pair data item derived in the current process, in the time axis direction. Meanwhile, in a case where the number of times that it was determined during the plurality of target deriving processes that there was continuity between representative pair data items is less than the predetermined number of times ("No" in STEP S17), the signal processing unit 6 finishes the process.

6. Specific Examples of Continuity Determination and Filtering

Now, the continuity determining process and the filtering will be described in detail using three specific examples. Using those specific examples, especially, the difference between a case where representative pair data items are derived and a case where representative pair data items are not derived will be described.

Figure 13A:
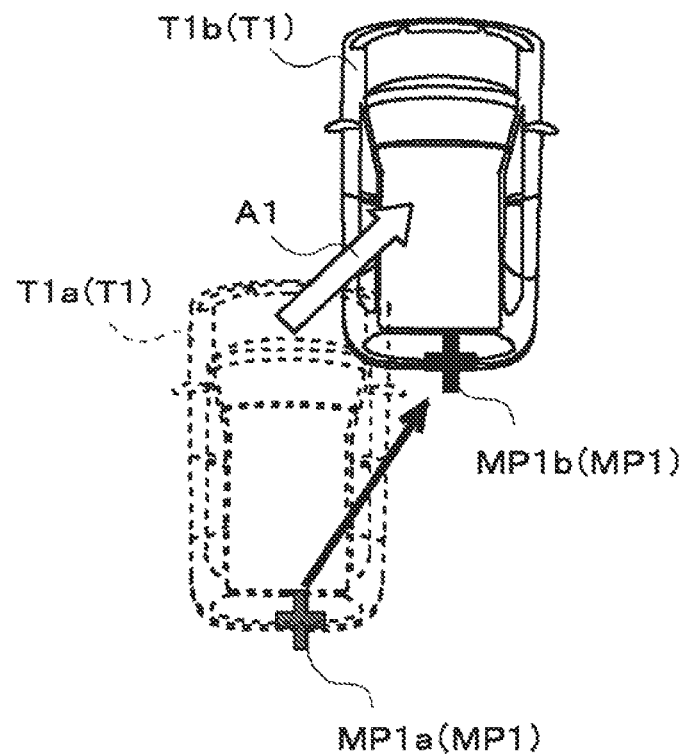
FIGS. 13A and 13B are views a state where a first representative deriving unit does not derive any representative pair data item in a previous process and a current process.
Figure 13B:
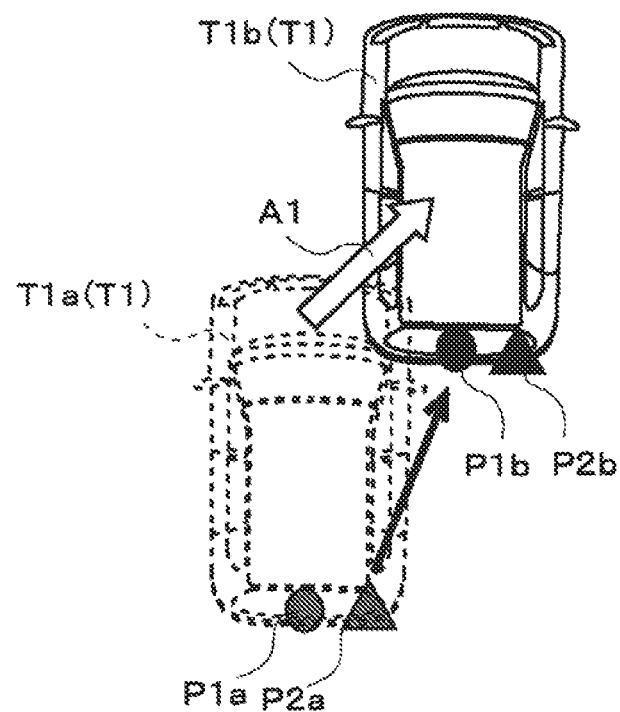

The first specific example will be described with reference to FIGS. 13A and 13B. FIG. 13A is a view illustrating a state where the first representative deriving unit 73 has derived representative pair data items MP1 in the previous process and the current process. FIG. 13B is a view illustrating a state where the first representative deriving unit 73 has not derived representative pair data items MP1 in the previous process and the current process.

In FIG. 13A, the first representative deriving unit 73 derives a representative pair data item MP1$a$ of a preceding vehicle T1$a$ in the previous process, and derives a representative pair data item MP1$b$ of a preceding vehicle T1$b$ in the current process. The preceding vehicle T1 moves in a direction shown by an arrow A1 (obliquely toward the front right side) after the previous process until the current process. The continuity determining unit 74 determines that the representative pair data item MP1$a$ and the representative pair data item MP1$b$ are data items having continuity. As a result, the filter unit 75 performs filtering on the representative pair data items MP1$a$ and MP1$b$. In this way, the radar device 1 can derive accurate target information items of reflection points of the preceding vehicle T1.

In contrast with this, in a case where the first representative deriving unit 73 does not derive the representative pair data item MP1$b$, in the previous process, two pair data items, that is, a pair data item P1$a$ and a pair data item P2$a$ of the preceding vehicle ha exist as shown in FIG. 13B. Also, in the current process, two pair data items, that is, a pair data item P1$b$ and a pair data item P2$b$ of the preceding vehicle T1$b$ exist. In a case where two pair data items whose longitudinal distances are substantially the same and whose relative speeds are substantially the same exist in each process as described above, the continuity determining unit 74 may perform erroneous continuity determination.

Here, correct continuity determination is determining that the pair data item P1$a$ of the previous process and the pair data item P1$b$ of the current process have continuity, and is determining that the pair data item P2$a$ of the previous process and the pair data item P2$b$ of the current process have continuity. In contrast with this, the continuity determining unit 74 may erroneously determine that the pair data item P2$a$ of the previous process and the pair data item P1$b$ of the current process are data items having continuity.

As a result, the filter unit 75 may perform filtering on the basis of the pair data item P2$a$ and the pair data item P1$b$, whereby positions on the left side from the actual positions of the targets of the preceding vehicle T1 may be derived as the positions of the targets. As described above, in a case where the first representative deriving unit 73 does not derive representative pair data items, the radar device 1 may be unable to derive accurate target information items of targets.

Figure 14A:
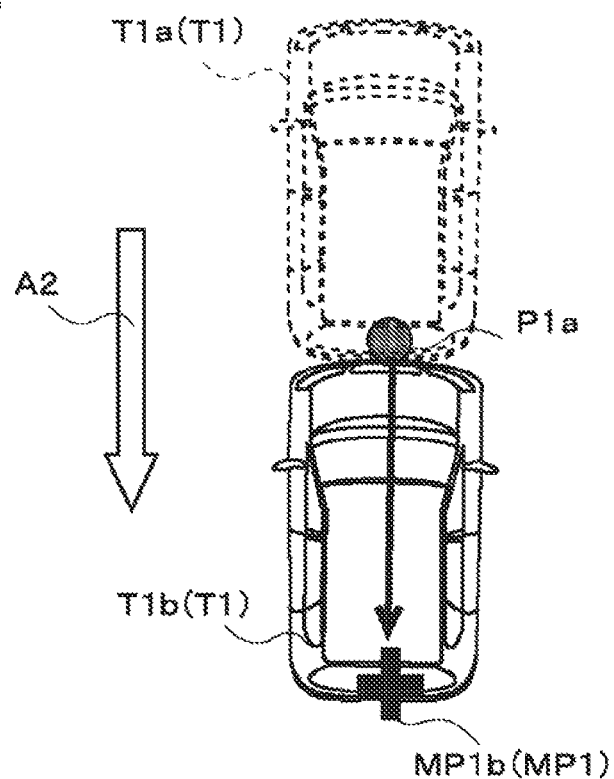
FIGS. 14A and 14B are views illustrating a state where the first representative deriving unit does not derive any representative pair data item in a current process.
Figure 14B:
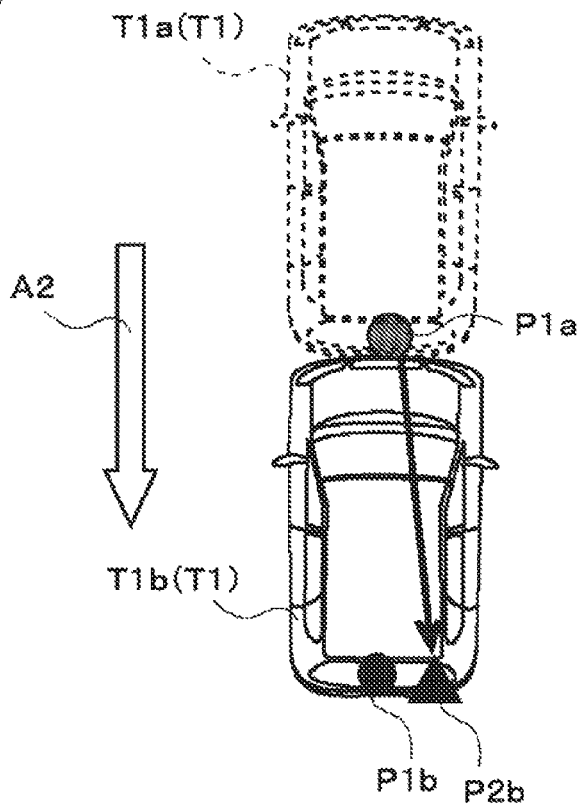

The second specific example will be described with reference to FIGS. 14A and 14B. FIG. 14A is a view illustrating a state where the first representative deriving unit 73 has derived the representative pair data item MP1$b$ in the current process. FIG. 14B is a view illustrating a state where the first representative deriving unit 73 does not derive a representative pair data item (for example, the representative pair data item MP1$a$) in the current process. Also, in the previous processes of FIGS. 14A and 14B, the number of pair data items is less than two, and thus a representative pair data item is not derived. That is, it is a state where the pairing unit 72 has generated only one pair data item.

In FIG. 14A, the pairing unit 72 generates the pair data item P1$a$ of the preceding vehicle T1$a$ in the previous process. Thereafter, the first representative deriving unit 73 derives the representative pair data item MP1$b$ of the preceding vehicle T1$b$ in the current process. The preceding vehicle T1 moves in a direction shown by an arrow A2 (backward) after the previous process until the current process. The continuity determining unit 74 determines that the pair data item P1$a$ and the representative pair data item MP1$b$ are data items having continuity.

As a result, the filter unit 75 performs filtering on the pair data item P1$a$ and the representative pair data item MP1$b$. In this way, even in a case where there is only one pair data item of the previous process and there are two pair data items of the current process, the radar device 1 can derive accurate target information items of targets of the preceding vehicle T1 on the basis of the pair data item P1$a$ of the previous process and the representative pair data item MP1$b$ of the current process.

In contrast with this, in a case where the first representative deriving unit 73 does not derive the representative pair data item MP1$b$ in the current process, in the current process, two pair data items, that is, the pair data item P1$b$ and the pair data item P2$b$ of the preceding vehicle T1$b$ exist as shown in FIG. 14B. In a case where two pair data items whose longitudinal distances are substantially the same and whose relative speeds are substantially the same exist in each process as described above, the continuity determining unit 74 may perform erroneous continuity determination. Here, correct continuity determination is determining that the pair data item P1$a$ of the previous process and the pair data item P1$b$ of the current process have continuity.

Also, in the previous process, a pair data item having continuity with the pair data item P2$b$ is not generated. For this reason, the pair data item P2$b$ is a pair data item (hereinafter, referred to as a new pair data item) generated for the first time in the current process. In this case, the continuity determining unit 74 may erroneously determine that the pair data item P1$a$ of the previous process and the pair data item P2$b$ of the current process are pair data items having continuity. As a result, the filter unit 75 may perform filtering on the basis of the pair data item P1$a$ and the pair data item P2$b$, whereby positions on the right side from the actual positions of the targets of the preceding vehicle T1 may be derived as the positions of the targets. As described above, in a case where the first representative deriving unit 73 does not derive representative pair data items, the radar device 1 may be unable to derive accurate target information items of targets.

Figure 15A:
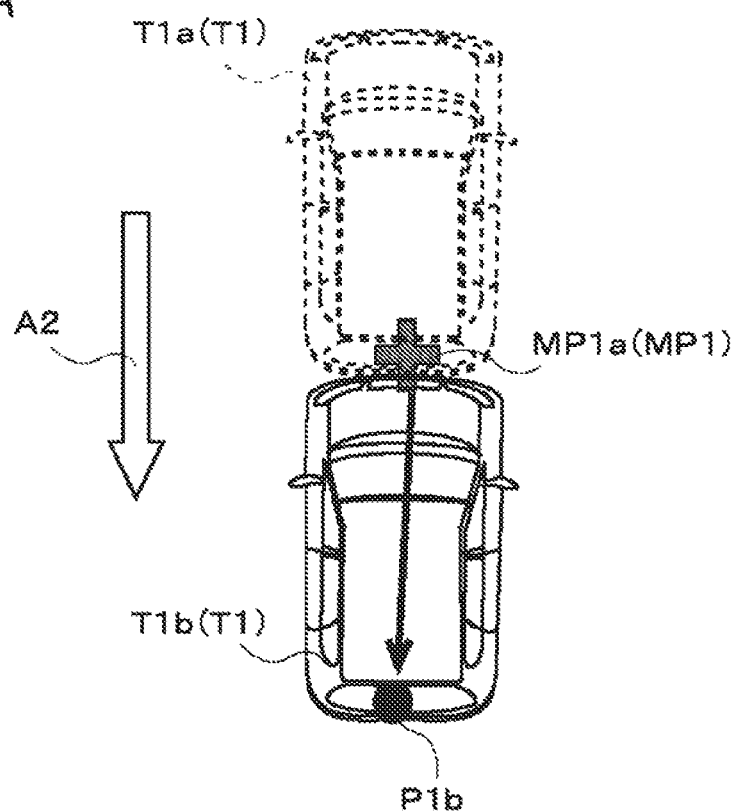
FIGS. 15A and 15B are views for explaining a state where the first representative deriving unit derives a representative pair data item and a state where the first representative deriving unit does not derive any representative pair data item.
Figure 15B:
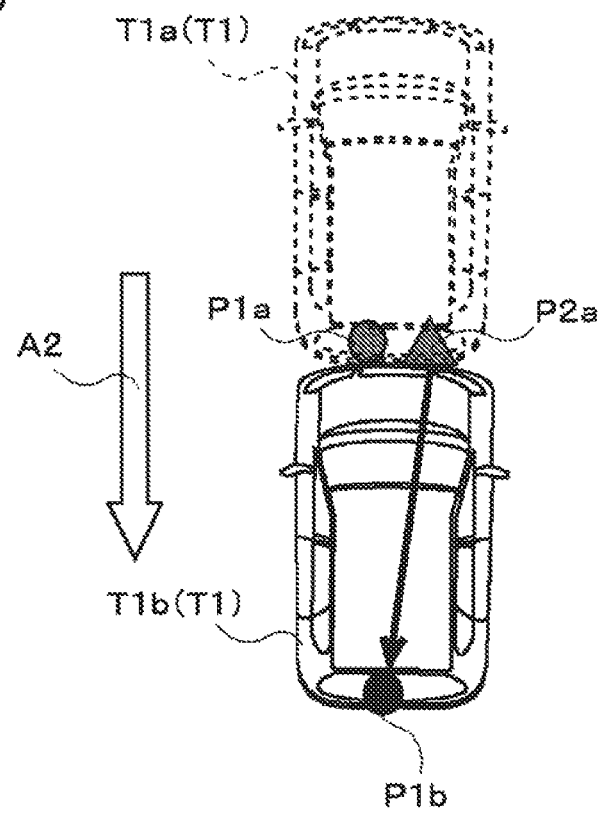

The third specific example will be described with reference to FIGS. 15A and 15B. FIG. 15A is a view illustrating a state where the first representative deriving unit 73 derives the representative pair data item MP1$a$ in the previous process. FIG. 15B is a view illustrating a state where the first representative deriving unit 73 does not derive a representative pair data item (for example, the representative pair data item. MP1$b$) in the current process. Also, in the current processes of FIGS. 15A and 15B, the number of pair data items is less than two, and thus a representative pair data item is not derived. That is, it is a state where the pairing unit 72 has generated only one pair data item.

In FIG. 15A, the first representative deriving unit 73 derives the representative pair data item MP1a of the preceding vehicle T1a in the previous process. Thereafter, the pairing unit 72 generates the pair data item P1b of the preceding vehicle T1b in the current process. The preceding vehicle T1 moves in a direction shown by an arrow A2 (backward) after the previous process until the current process. The continuity determining unit 74 determines that the representative pair data item. MP1a and the pair data item P1b are data items having continuity.

As a result, the filter unit 75 performs filtering on the representative pair data item MP1a and the pair data item P1b. In this way, even in a case where there are two pair data items of the previous process and there is only one pair data item of the current process, the radar device 1 can derive accurate target information items of targets of the preceding vehicle T1 on the basis of the representative pair data item. MP1a of the previous process and the pair data item P1b of the current process.

Also, in a case where there are two pair data items in the previous process, if it is determined that one pair data item is a pair data item having continuity with the pair data item of the current process, and it is not determined that the other pair data item has continuity with the pair data item of the current process, the other pair data item becomes an object of extrapolation as will be described below. However, if the first representative deriving unit 73 derives a representative pair data item in the previous process, it is possible to prevent a pair data item from becoming an object of extrapolation.

In contrast with this, in a case where the first representative deriving unit 73 does not derive the representative pair data item MP1a in the previous process, in the previous process, two pair data items, that is, the pair data item P1a and the pair data item P2a of the preceding vehicle T1a exist as shown in FIG. 15B. In a case where two pair data items whose longitudinal distances are substantially the same and whose relative speeds are substantially the same exist in each process as described above, the continuity determining unit 74 may perform erroneous continuity determination. Here, correct continuity determination is determining that the pair data item P1a of the previous process and the pair data item P1b of the current process have continuity.

Also, in the current process, a pair data item having continuity with the pair data item P2a is not generated. For this reason, the pair data item P2a originally becomes an object of extrapolation in the current process. In this case, the continuity determining unit 74 may erroneously determine that the pair data item P2a of the previous process and the pair data item P1b of the current process are pair data items having continuity.

As a result, the filter unit 75 may perform filtering on the basis of the pair data item P2a and the pair data item P1b, whereby positions on the right side from the actual positions of the targets of the preceding vehicle T1 may be derived as the positions of the targets. As described above, in a case where the first representative deriving unit 73 does not derive representative pair data items, the radar device 1 may be unable to derive accurate target information items of targets. Also, as described above, in the case where representative pair data items are not derived, even if it is determined that one pair data item of the previous process is a data item having continuity, the other pair data item becomes an object of extrapolation. Further, if the pair data item which is an object of extrapolation is output to the vehicle control device 2, the vehicle control device 2 may be unable to perform appropriate control on the vehicle.

7. Summary

As described above, the radar device 1 of the present embodiment derives one representative pair data item from two pair data items before continuity determination is performed. Therefore, it is possible to prevent pair data items corresponding to different reflection points of one object from being combined as data items having continuity.

That is, on the basis of two pair data items whose positions in the angle direction are close to each other and which are substantially the same in the position in the distance direction intersecting with the angle direction and are substantially the same in relative speed, the first representative deriving unit 73 derives one representative pair data item.

The continuity determining unit 74 determines whether one representative pair data item derived in the previous process and one representative pair data item derived in the current process satisfy the predetermined determination conditions. The predetermined determination conditions are conditions for determining whether the representative pair data item of the previous process and the representative pair data item of the current process are data items corresponding to the same target and derived at different process timings.

In a case where the representative pair data item of the current process satisfies the predetermined determination conditions, the continuity determining unit 74 determines that the representative pair data item of the current process is a data item having temporal continuity with the representative pair data item of the previous process. Therefore, the radar device 1 can surely determine a representative pair data item of the previous process and a representative pair data item of the current process corresponding to the same target, and can derive accurate target information items of targets.

Second Embodiment

Subsequently, a second embodiment will be described. The data processing unit 7 of a radar device 1a of the second embodiment performs a process of deriving history pair data items, in addition to the processes of the radar device 1 of the first embodiment. The history pair data items are pair data items obtained by associating history peaks of the up sections with history peaks of the down sections. The history peaks are angle peaks of the current process. The angle peaks are extracted on the basis of a prediction value predicted on the basis of the filter data items of the previous process.

In a case where there are two pair data items to be the processed and all of the pair data items are history pair data items, the first representative deriving unit 73 of the radar device 1a stops representative pair data item derivation.

The configuration and processes of the radar device 1a of the second embodiment is substantially the same as those of the first embodiment except for some processes relative to the history pair data items. Hereinafter, the difference will be mainly described with reference to FIGS. 16 to 20.

8. Block Diagram of Radar Device

Figure 16:
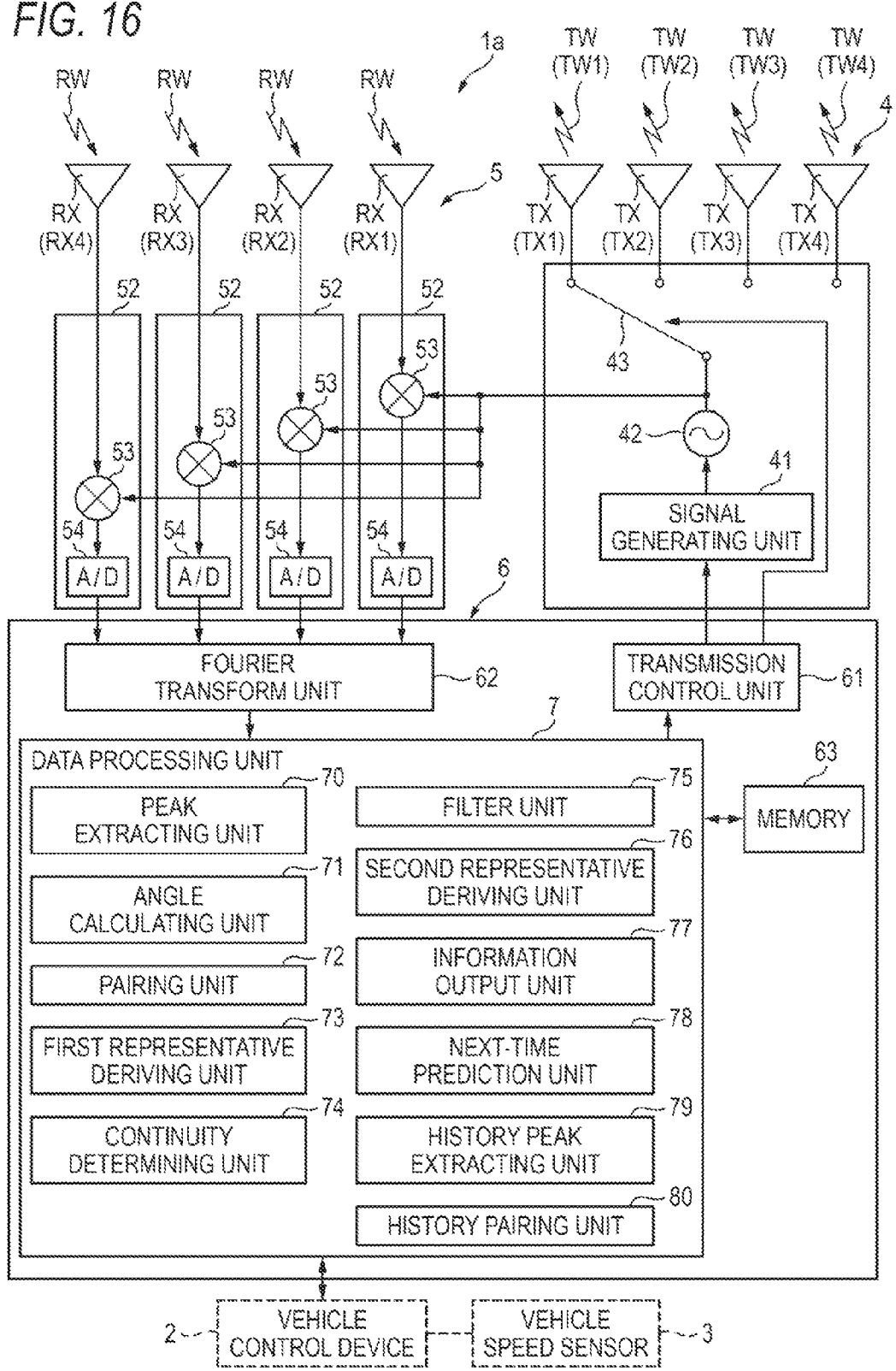
FIG. 16 is a view illustrating the configuration of a radar device of a second embodiment.

FIG. 16 is a view illustrating the configuration of the radar device 1a of the second embodiment. The data processing unit 7 of the radar device 1a includes a next-time prediction unit 78, a history peak extracting unit 79, and a history pairing unit 80. On the basis of the filter data items of the current process derived by the filter unit 75, the next-time prediction unit 78 calculates a prediction value relative to history pair data items to have continuity with those filter data items in the next target deriving process (hereinafter, referred to as the "next process"). This prediction value is used for the history peak extracting unit 79 to extract history peaks in the next process.

From a plurality of frequency peaks exceeding the signal power pw1, the history peak extracting unit 79 extracts frequency peaks belonging to the up sections and the down sections and relative to the history peaks, on the basis of the prediction value. Specifically, the history peak extracting unit 79 uses the frequency of the prediction value as a reference frequency, and extracts frequency peaks existing in a predetermined frequency range between frequencies on the positive side and negative side from the reference frequency (for example, between +3 BIN and −3 BIN).

Thereafter, on the basis of the frequency peaks extracted by the history peak extracting unit 79, the angle calculating unit 71 calculates angle peaks.

The history peak extracting unit 79 extracts angle peaks of the up sections and the down sections as history peaks on the basis of the prediction value. Specifically, the history peak extracting unit 79 uses the angle of the prediction value as a reference angle, and extracts angle peaks existing in a predetermined angle range between angles on the positive side and negative side from the reference angle (for example, +4° and −4°), as history peaks.

The history pairing unit 80 associates the history peaks extracted from the up sections with the history peaks extracted from the down sections, thereby generating history pair data items.

Here, in a case where the pair data item P1 and the pair data item P2 satisfy all of the conditions (a1) to (a5), the first representative deriving unit 73 of the first embodiment derives the representative pair data item MP1.

In contrast with this, the first representative deriving unit 73 of the second embodiment determines whether two pair data items satisfy the conditions (a1) to (a5), and determines whether two pair data items satisfying all of the conditions (a1) to (a5) satisfy a condition (a6).

(a6) A condition that two pair data items (for example, P1 and P2) should be history pair data items.

According to the condition (a6), in a case where both of the pair data item P1 and the pair data item P2 are history pair data items, it is determined that they are pair data items belonging to different objects, respectively. For example, it may be determined that the pair data item P1 is a pair data item belonging to a preceding vehicle existing in the range of the lane of the vehicle, and the pair data item P2 is a pair data item belonging to an adjacent vehicle existing in the range of an adjacent lane. In this case, if the adjacent vehicle runs in the adjacent lane in the vicinity of the lane of the vehicle, and a part (for example, a door mirror) of the adjacent vehicle exists in the range of the lane of the vehicle, the two pair data items originally belonging to the different objects may satisfy the conditions (a1) to (a5), whereby it may be erroneously determined that they are pair data items belonging to one object. As a result, the radar device 1a becomes unable to derive accurate target information items of targets. The condition (a6) is a condition provided to prevent such an erroneous determination.

9. Flow Chart of Process

Figure 17:
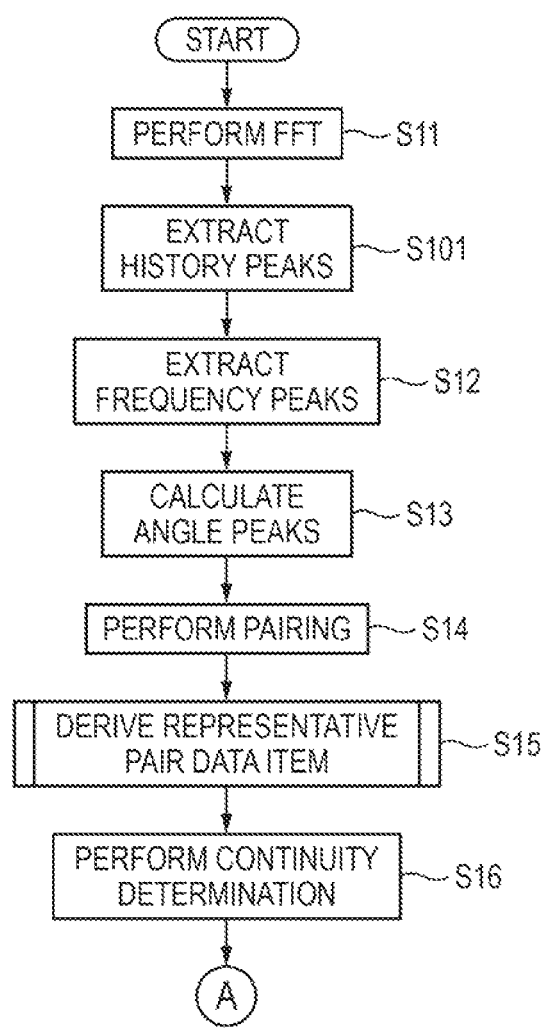
FIG. 17 is a flow chart of target deriving process according to the second embodiment.
Figure 18:
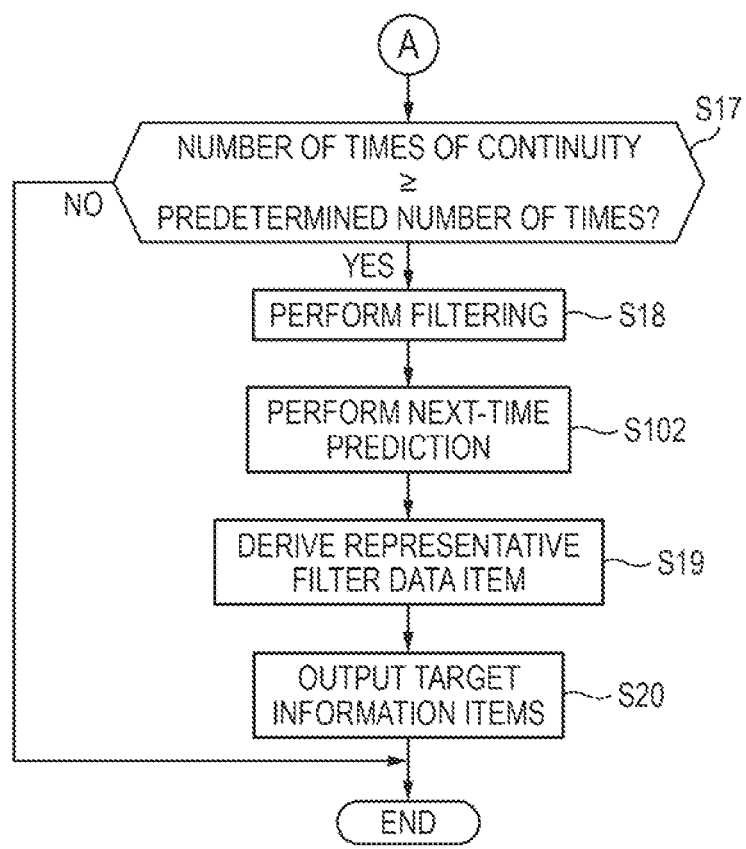
FIG. 18 is another flow chart of the target deriving process according to the second embodiment.

FIGS. 17 and 18 are flow charts of a target deriving process of the second embodiment. In STEP S11, the Fourier transform unit 62 performs fast Fourier transform (FFT) on beat signals output from the plurality of individual receiving units 52, respectively.

Subsequently, in STEP S101, from a plurality of frequency peaks exceeding the signal power pw1, the history peak extracting unit 79 extracts frequency peaks belonging to the up sections and the down sections and relative to the history peaks, on the basis of the prediction value.

In STEP S13, the angle calculating unit 71 calculates angle peaks representing the angles of targets relative to the frequency peaks, in each section of the up sections and the down sections, by the predetermined angle estimation method.

From the angle peaks calculated in the process of STEP S13, the history peak extracting unit 79 extracts angle peaks of the up sections and the down sections as history peaks on the basis of the prediction value.

In STEP S14, the pairing unit 72 associates the angle peaks of the up sections with the angle peaks of the down sections, thereby generating pair data items.

In the process of STEP S14, the history pairing unit 80 associates the history peaks extracted from the up sections with the history peaks extracted from the down sections, thereby generating history pair data items.

The first representative deriving unit 73 performs determination on the basis of not only the conditions (a1)) to (a5) but also the condition (a6). That is, in STEP S15, the first representative deriving unit 73 determines whether two pair data items are history pair data items.

Thereafter, if the continuity determining unit 74 determines in STEPS S16 and S17 that there is continuity, in STEP S18, the filter unit 75 derives filter data items.

Thereafter, the next-time prediction unit 78 calculates a prediction value relative to history pair data items. That is, on the basis of the filter data items of the current process derived by the filter unit 75, the next-time prediction unit 78 calculates a prediction value relative to history pair data items to have temporal continuity with those filter data items in the next process.

10. Representative Pair Data Deriving Process

Figure 19:
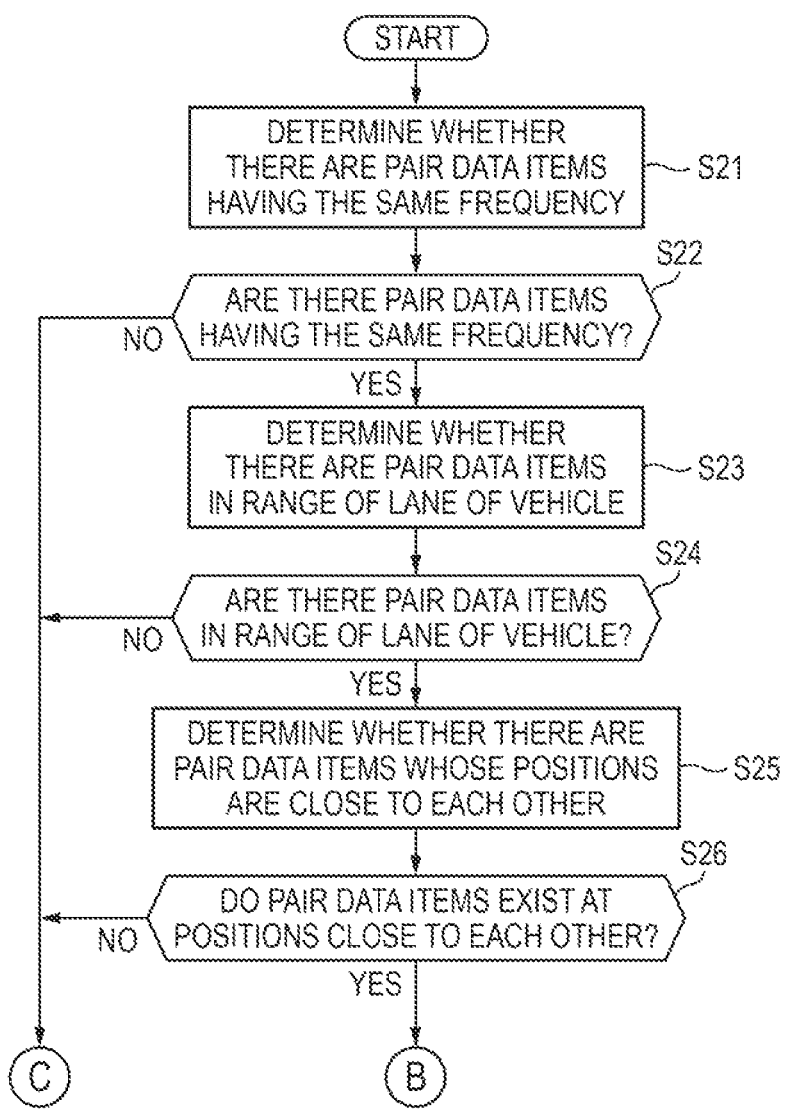
FIG. 19 is a flow chart of a representative pair data deriving process according to the second embodiment.
Figure 20:
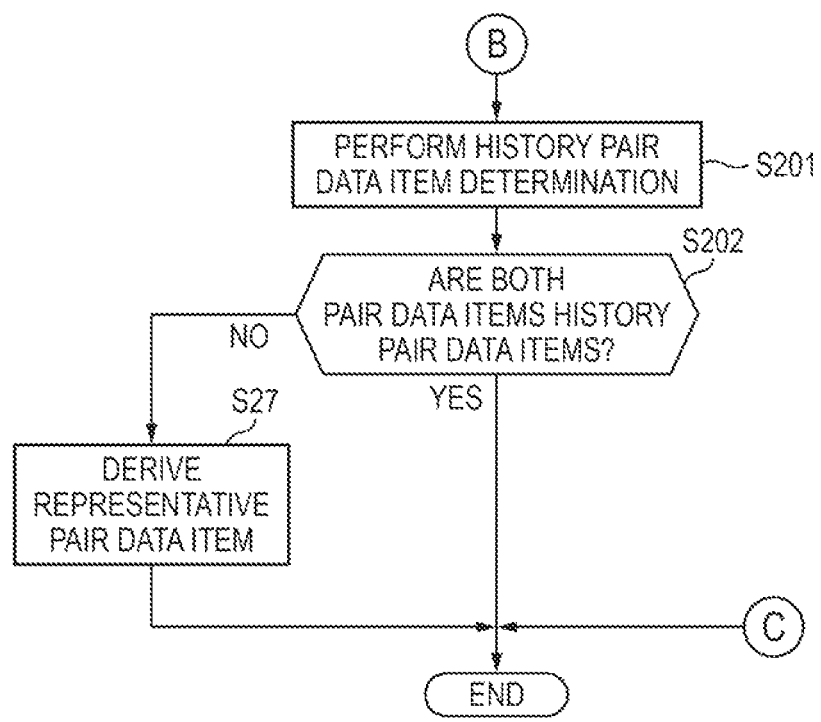
FIG. 20 is another flow chart of the representative pair data deriving process according to the second embodiment.

FIGS. 19 and 20 are flow charts of a representative pair data deriving process according to the second embodiment.

In STEP S25, the first representative deriving unit 73 determines whether the positions of the two pair data items in the angle direction are close to each other. Then, in a case where the interval between the position of the pair data item P1 and the position of the pair data item P2 in the vehicle width direction is between +1.5 m and −1.5 m, the first representative deriving unit 73 determines that the pair data item. P1 and the pair data item P2 satisfy the condition (a5) ("Yes" in STEP S26), and determines whether the pair data item P1 and the pair data item P2 are history pair data items, on the basis of the condition (a6), in STEP S201.

In a case where both of the pair data item P1 and the pair data item P2 are history pair data items ("Yes" in STEP S202), the first representative deriving unit 73 stops the representative pair data deriving process. Meanwhile, in a case where at least one of the pair data item P1 and the pair data item P2 is not a history pair data item, in STEP S27, the first representative deriving unit 73 calculates a representative pair data item on the basis of the two pair data items. The case where at least one is not a history pair data item is a case where only one of the pair data item P1 and the pair data item P2 is a history pair data item or a case where both of the pair data item P1 and the pair data item P2 are new pair data items. In the above described way, the radar device 1a can avoid derivation of one representative pair data item based on pair data items belonging to different objects, and can prevent derivation of incorrect target information items of targets. Different objects are, for example, two objects of a preceding vehicle and an adjacent vehicle as described above.

Third Embodiment

Subsequently, a third embodiment will be described. In a case where there are three pair data items, the first representative deriving unit 73 of the data processing unit 7 of a radar device 1a of the third embodiment performs a process according to the number of history pair data items included in the three pair data items.

The configuration and processes of the radar device 1a of the third embodiment is substantially the same as those of the second embodiment except for some processes relative to the history pair data items. Hereinafter, the difference will be mainly described with reference to FIGS. 21 and 22.

11. Representative Pair Data Deriving Process

Figure 21:
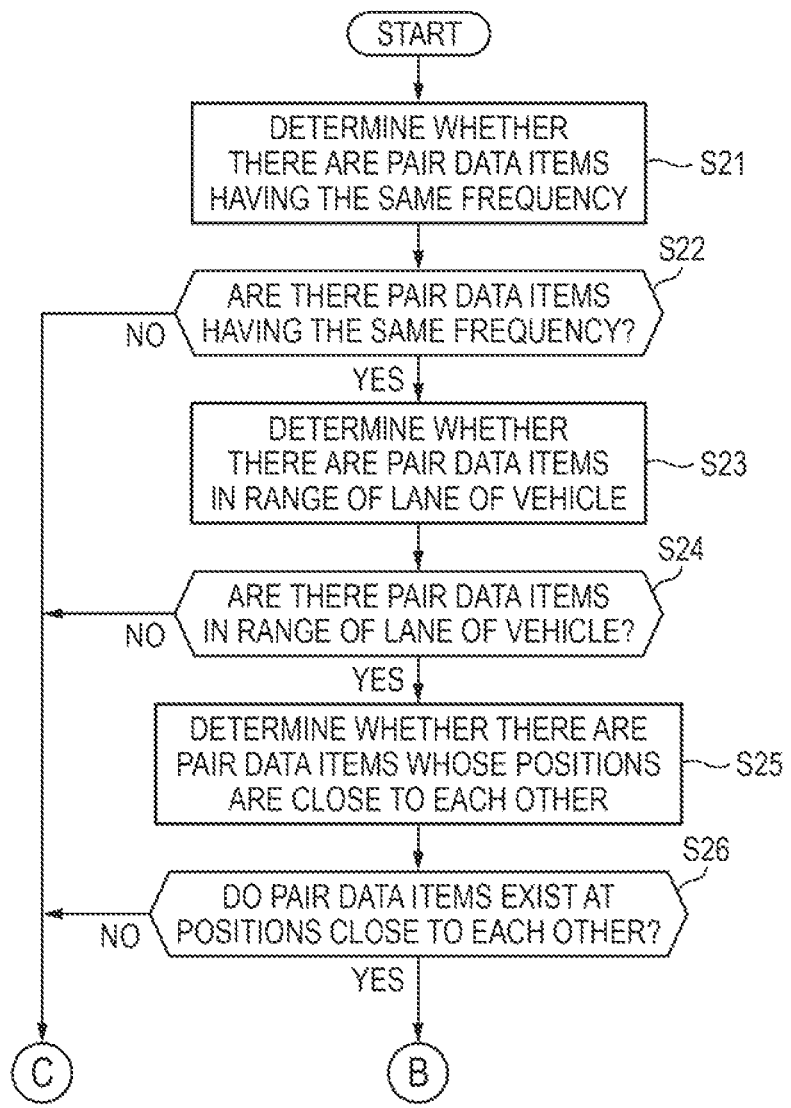
FIG. 21 is a flow chart of a representative pair data deriving process according to a third embodiment.
Figure 22:
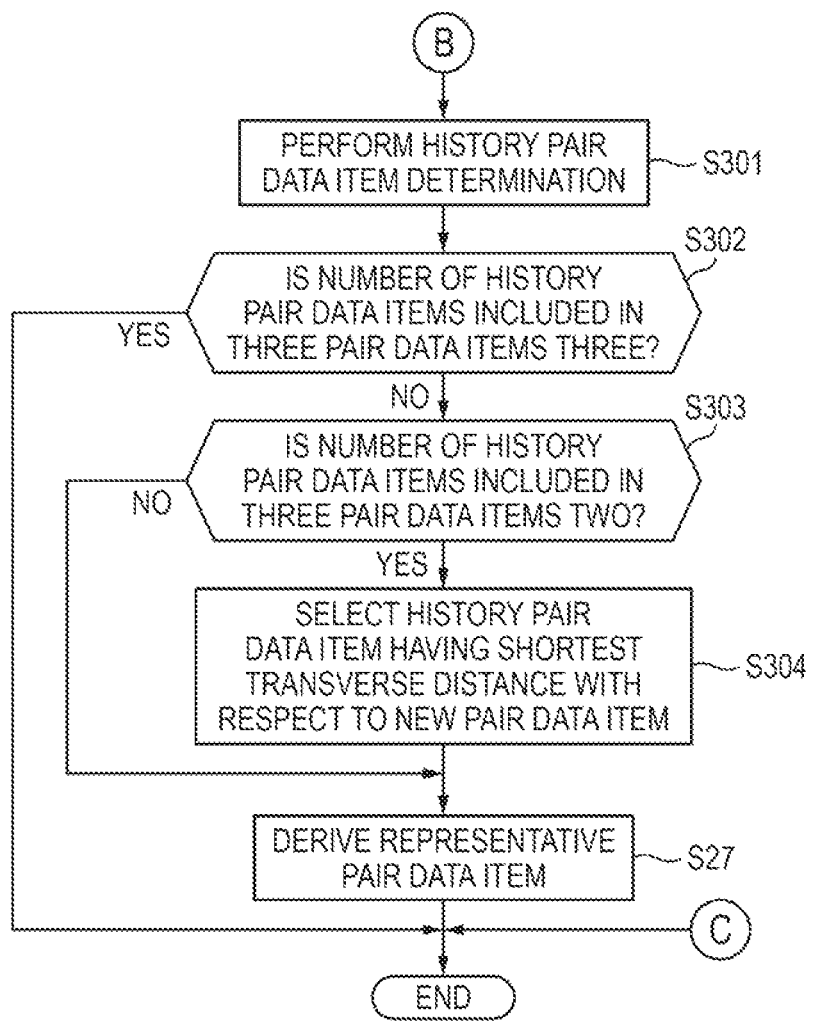
FIG. 22 is another flow chart of the representative pair data deriving process according the third embodiment.

FIGS. 21 and 22 are flow charts of a representative paired data deriving process according to the third embodiment. In the first and second embodiments, the two pair data items P1 and P2 have been described as examples of the plurality of pair data items. However, in the third embodiment, a case where there are three pair data items will be described. For example, it is assumed that the three pair data items are the pair data item P1, the pair data item P2, and a pair data item P3. The pair data item P3 is, for example, a pair data item corresponding to a reflection point positioned on the left side of the rear bumper of the preceding vehicle T1 in the vehicle width direction.

In STEP S21, on the basis of the conditions (a1)) and (a2), the first representative deriving unit 73 determines whether the frequencies of the up sections and down sections of the three pair data items including the pair data item P3 are substantially the same. Also, in STEP S23, on the basis of the conditions (a3) and (a4), the first representative deriving unit 73 determines whether the three pair data items including the pair data item P3 exist in the range of the lane of the vehicle. Further, in STEP S25, on the basis of the condition (a5), the first representative deriving unit 73 determines whether the three pair data items including the pair data item P3 are pair data items existing at positions relatively close to one another in the vehicle width direction. In a case where the three pair data items including the pair data item P3 satisfy all of the conditions ("Yes" in STEPS S22, S24, and S26), in STEP S301, on the basis of the following conditions (a7) and (a8), the first representative deriving unit 73 determines whether the pair data item P1 and the pair data item P2 are history pair data items.

(a7) A condition that all of the pair data items P1, P2, and P3 should be history pair data items.

(a8) A condition that two of the pair data items P1, P2, and P3 should be history pair data items.

According to the condition (a7), whether the three pair data items, that is, the pair data item P1, the pair data item P2, and the pair data item P3 are history pair data items is determined. In a case where the three pair data items are history pair data items, representative pair data item derivation is stopped.

According to the condition (a8), whether two pair data items of the three pair data items, that is, the pair data item P1, the pair data item P2, and the pair data item P3 are history pair data items is determined. In a case where two pair data items are history pair data items, the other pair data item is a new pair data item. The first representative deriving unit 73 selects a history pair data item belonging to an object to which the new pair data item belongs, from the two history pair data items, and derives a representative pair data item on the basis of the new pair data item and the selected history pair data item.

In the process of FIG. 22, in a case where all of the three pair data items are history pair data items ("Yes" in STEP S302), the first representative deriving unit 73 stops the representative pair data deriving process. In the above described way, the radar device 1a can avoid derivation of one representative pair data item based on pair data items belonging to different objects, and can prevent derivation of incorrect target information items of targets.

In a case where the number of history pair data items is not three ("No" in STEP S302, in STEP S303, the first representative deriving unit 73 determines whether the number of history pair data items included in the three pair data items is two.

In a case where the number of history pair data items included in the three pair data items is two ("Yes" in STEP S303), in STEP S304, the first representative denying unit 73 select a history pair data item (hereinafter, referred to as the "minimum history pair data item") having the shortest transverse distance with respect to the new pair data item.

Therefore, in STEP S27, the first representative deriving unit 73 derives a representative pair data item on the basis of the new pair data item and the minimum history pair data item. In this way, even in a case where there is two history pair data items, the radar device 1a can surely select a history pair data item belonging to an object to which the new pair data item belongs, and can derive accurate target information items of targets.

Also, the first representative deriving unit 73 does not use the pair data item (hereinafter, referred to as the "other history pair data item") having a transverse distance from the new pair data item larger than that of the minimum history pair data item to derive a representative pair data item. The reason is that the possibility that the other history pair data item is a history pair data item belonging to an object (for example, the adjacent vehicle) different from the object (for example, the preceding vehicle) to which the new pair data item and the minimum history pair data item belong is relatively high.

In a case where the first representative deriving unit 73 determines that the number of history pair data items included in the three pair data items is not two ("No" in STEP S303), the number of history pair data items included in the three pair data items is 1 or 0 (zero). Therefore, the first representative deriving unit 73 determines that all of the three pair data items are pair data items belonging to the same object, and derives a representative pair data item on the basis of the three pair data items in STEP S27.

MODIFICATIONS

Although the embodiments of the present invention have been described above, the present invention is not limited to the above described embodiments, and can be modified in various forms. Hereinafter, these modifications will be described. All forms including the above described embodiments and the following embodiments to be described below can be appropriately combined.

In the first embodiment, the two pair data items P1 and P2 have been described as examples. However, the number of pair data items may be three or more. For example, in a case where the third pair data item is denoted by a reference symbol "P3", the pair data item P3 is, for example, a pair data item corresponding to a reflection point positioned on the left side of the rear bumper of the preceding vehicle T1. As described above, the first representative deriving unit 73 may derive one representative pair data item on the basis of three or more pair data items.

Specifically, for example, in a case where there are three pair data items, on the basis of the conditions (a1) and (a2), the first representative deriving unit 73 performs the above described determination based on the conditions (a1) and (a2), and determines whether the frequencies of the up section and down section of the pair data item P3 are substantially the same as the frequencies of the up sections and down sections of the other pair data items. Also, on the basis of the conditions (a3) and (a4), the first representative deriving unit 73 performs the above described determination based on the conditions (a3) and (a4), and determines whether the pair data item P3 exists in the range of the lane of the vehicle. Further, on the basis of the condition (a5), the first representative deriving unit 73 performs the above described determination based on the condition (a5), and determines whether the pair data item P3 and at least one pair data item (for example, the pair data item P1) of the other pair data items are pair data items existing at positions relatively close to each other in the vehicle width direction. In a case where all of the three pair data items including the pair data item P3 satisfy all of the conditions, the first representative deriving unit 73 derives a representative pair data item and sets the parameters of the representative pair data item.

In the third embodiment, the three pair data items P1, P2, and P3 have been described as examples. However, the number of pair data items to be objects of the process of the third embodiment may be four or more.

Also, in the above described embodiments, the continuity determining unit 74 determines whether the representative pair data item of the previous process and the representative pair data item of the current process have continuity. In contrast with this, the continuity determining unit 74 may use a past process earlier than the previous process in the continuity determination.

Also, in the first embodiment, the filter unit 75 derives filter data items, and the second representative deriving unit 76 derives a representative pair data item on the basis of the plurality of filter data items. In contrast with this, the filter unit 75 may not derive filter data items. In this case, on the basis of a plurality of representative pair data items of the current process, the second representative deriving unit 76 may derive a data item corresponding to a representative pair data item. In other words, the second representative deriving unit 76 may derive a representative past pair data item on the basis of a plurality of past correspondence pair data items. The past correspondence pair data items are data items including filter data items or/and representative pair data items having continuity.

Also, in the first embodiment, the conditions (a3) and (a4) that the transverse distances of two pair data items should be in the range of the lane of the vehicle are defined. In contrast with this, conditions that the transverse distances of two pair data items should be in a range wider than the range of the lane of the vehicle may be defined. For example, the ranges of the conditions (a3) and (a4) may be ranges including an adjacent lane next to the lane of the vehicle. Specifically, the condition (a3) may be defined as a condition that the transverse distance of the pair data item P1 should be in a range between −5.4 m and +5.4 m, and the condition (a4) may be defined as a condition that the transverse distance of the pair data item P2 should be in a range between −5.4 m and +5.4 m. Also, the ranges of the conditions (a3) and (a4) may be ranges narrower than the range of the lane of the vehicle. For example, the ranges of the conditions (a3) and (a4) may be the range of a central part of the lane of the vehicle (for example, a range between −0.9 m and +0.9 m). Specifically, the condition (a3) may be defined as a condition that the transverse distance of the pair data item P1 should be in a range between −0.9 m and +0.9 m, and the condition (a4) may be defined as a condition that the transverse distance of the pair data item P2 should be in a range between −0.9 m and +0.9 m. Also, these determination conditions relative to transverse distances may be changed according to the types of targets, that is, whether targets are moving targets or still targets.

Also, in each embodiment described above, the number of transmitting antennae TX of the radar device 1 is four and the number of receiving antennae RX is four. Theses numbers of transmitting antennae TX and receiving antennae RX of the radar device 1 are examples, and may be other numbers as long as it is possible to detect a plurality of targets.

Also, in each embodiment described above, as an example of the angle estimation method of the radar device, ESPRIT has been described. However, besides ESPRIT, other angle estimation methods such as DBF (Digital Beam Forming), PRISM (Propagator method based on an Improved Spatial-smoothing Matrix), and MUSIC (Multiple Signal Classification) may be used.

Also, in each embodiment described above, the radar device is provided at the front portion (for example, the inside of the front bumper) of the vehicle. In contrast to this, the radar device 1 may be provided at one or more places of rear portions (for example, a rear bumper), left portions (for example, a left door mirror), and right portions (for example, a right door mirror) of the vehicle as long as it is possible to output a transmission wave from each corresponding place to the outside of the vehicle.

Also, in each above described embodiment, outputting from the transmitting antennae may use any method capable of detecting target information items, such as electric waves, ultrasonic waves, light, and lasers.

Also, in each above described embodiment, the radar device may be used in other devices besides vehicles. For example, the radar device may be used in an aircraft, a ship, and so on.

Also, in each above described embodiment, various functions are implemented in a software wise by arithmetic processing of the CPU according to programs. However, some of those functions may be implemented by electric hardware circuits. Also, conversely, some of functions which are implemented by hardware circuits may be implemented in software.

What is claimed is:

1. A radar device comprising:
   a peak extracting unit that extracts frequency peaks representing the difference frequencies between a transmission signal whose frequency varies in a predetermined cycle and reception signals obtained by receiving reflected waves of a transmission wave based on the transmission signal from targets, in each section of an up section in which the frequency of the transmission signal increases and a down section in which the frequency of the transmission signal decreases:
an angle calculating unit that calculates angle peaks representing angles of the targets relative to the frequency peaks;
a pairing unit that generates pair data items by associating the angle peaks of the up section and the angle peaks of the down sections;
a first representative deriving unit that derives one representative pair data item on the basis of a plurality of a specific pair data items whose positions in an angle direction are close to each other and which are substantially the same in the position in a distance direction intersecting with the angle direction and are substantially the same in relative speed; and
a continuity determining unit that determines whether one representative pair data item derived in a past process and one representative pair data item derived in a current process are data items belonging to the same target at different process timings,
wherein the first representative deriving unit derives one representative pair data item before continuity determination of the continuity determining unit at the same process timing is performed.

2. The radar device according to claim 1, wherein:
in a case where there is not a plurality of specific pair data items in the past process, the first representative deriving unit stops representative pair data item derivation of the past process, and
the continuity determining unit determines whether one pair data item generated in the past process and one representative pair data item derived in the current process are data items belonging to the same target at different process timings.

3. The radar device according to claim 1, wherein:
in a case where there is not a plurality of specific pair data items in the current process, the first representative deriving unit stops representative pair data item derivation of the current process, and
the continuity determining unit determines whether one representative pair data item derived in the past process and one pair data item generated in the current process are data items belonging to the same target at different process timings.

4. The radar device according to claim 1, wherein:
in a case where a vehicle equipped with the radar device runs a lane and there is a plurality of specific pair data items, if all of the plurality of specific pair data items exist in a range of the lane of the vehicle, the first representative deriving unit derives the representative pair data item.

5. The radar device according to claim 1, further comprising:
a second representative deriving unit that derives one representative past correspondence pair data item on the basis of a plurality of past correspondence pair data items which is included in past correspondence pair data items of the current process determined as having continuity and exists in a predetermined range in the distance direction, after the continuity determination is performed.

6. The radar device according to claim 5, further comprising:
a history peak extracting unit that extracts history peaks belonging to an object to which the past correspondence pair data items belong, on the basis of a prediction value predicted from the past correspondence pair data items, in each section of the up section and the down section in the next process; and
a history pairing unit that generates history pair data items by associating the history peaks of the up section and the history peaks of the down section,
wherein in a case where there is a plurality of specific pair data items and all of the pair data items are the history pair data items, the first representative deriving unit stops representative pair data item derivation.

7. The radar device according to claim 5, wherein:
in a case where the plurality of specific pair data items is data items including two or more history pair data items and one new pair data item other than the history pair data items, the first representative deriving unit derives the representative pair data item on the basis of the new pair data item and a history pair data item whose position is the closest to the new pair data item in the angle direction.

8. A signal processing method comprising:
a step (a) of extracting frequency peaks representing the difference frequencies between a transmission signal whose frequency varies in a predetermined cycle and reception signals obtained by receiving reflected waves of a transmission wave based on the transmission signal from targets, in each section of an up section in which the frequency of the transmission signal increases and a down section in which the frequency of the transmission signal decreases:
a step (b) of calculating angle peaks representing angels of the targets relative to the frequency peaks;
a step (c) of generating pair data items by associating the angle peaks of the up section and the angle peaks of the down sections;
a step (d) of deriving one representative pair data item on the basis of a plurality of a specific pair data items whose positions in an angle direction are close to each other and which are substantially the same in the position in a distance direction intersecting with the angle direction and are substantially the same in relative speed; and
a step (e) of determining whether one representative pair data item derived in a past process and one representative pair data item derived in a current process are data items belonging to the same target at different process timings,
wherein the step (d) derives one representative pair data item before continuity determination of the continuity determining unit at the same process timing is performed.

* * * * *